(12) United States Patent
Sharma et al.

(10) Patent No.: US 10,606,450 B2
(45) Date of Patent: Mar. 31, 2020

(54) METHOD AND SYSTEM FOR VISUAL REQUIREMENTS AND COMPONENT REUSE DRIVEN RAPID APPLICATION COMPOSITION

(71) Applicant: Accenture Global Solutions Limited, Dublin (IE)

(72) Inventors: Vibhu Sharma, Bangalore (IN); Vikrant Kaulgud, Pune (IN); Shubhashis Sengupta, Bangalore (IN); Poulami Debnath, Kolkata (IN); Milind Ravikiran Savagaonkar, Sangli (IN); Shrikanth Narayanaswamy Chandrasekaran, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 160 days.

(21) Appl. No.: 15/492,501

(22) Filed: Apr. 20, 2017

(65) Prior Publication Data
US 2017/0371504 A1 Dec. 28, 2017

(30) Foreign Application Priority Data
Jun. 24, 2016 (IN) ............................ 201641021701

(51) Int. Cl.
*G06F 3/0482* (2013.01)
*G06F 9/451* (2018.01)

(52) U.S. Cl.
CPC ............ *G06F 3/0482* (2013.01); *G06F 9/451* (2018.02)

(58) Field of Classification Search
CPC .................................................. G06F 3/0482

USPC ......................................................... 715/763
See application file for complete search history.

(56) References Cited

U.S. PATENT DOCUMENTS

| | | | | | |
|---|---|---|---|---|---|
| 5,586,239 | A * | 12/1996 | Ueda | ........................ | G06F 16/94 715/207 |
| 6,721,713 | B1 * | 4/2004 | Guheen | ................... | G06Q 50/01 705/1.1 |
| 7,451,404 | B1 * | 11/2008 | Kirkpatrick | ............. | G06F 16/26 715/780 |
| 9,262,366 | B2 * | 2/2016 | Lenzmeier | ................ | G06F 8/60 |
| 9,392,112 | B2 * | 7/2016 | Vymenets | ............ | H04M 3/5166 |
| 9,679,090 | B1 * | 6/2017 | Marolia | .............. | G06F 11/3692 |
| 9,927,944 | B1 * | 3/2018 | Blew | ........................ | H04L 67/12 |
| 10,261,677 | B2 * | 4/2019 | Hasija | ...................... | H04L 41/50 |
| 2004/0003390 | A1 * | 1/2004 | Canter | ....................... | G06F 8/61 717/178 |
| 2004/0148271 | A1 * | 7/2004 | Wood | ...................... | G06Q 30/02 |
| 2005/0066304 | A1 * | 3/2005 | Tattrie | ....................... | G06F 8/20 717/101 |
| 2006/0206856 | A1 * | 9/2006 | Breeden | .................... | G06F 8/20 717/101 |
| 2007/0079286 | A1 * | 4/2007 | Cook | ...................... | G06F 16/94 717/113 |
| 2007/0083853 | A1 * | 4/2007 | Cook | ........................ | G06F 8/38 717/120 |

(Continued)

*Primary Examiner* — Daniel Rodriguez
(74) *Attorney, Agent, or Firm* — Brinks Gilson & Lione

(57) ABSTRACT

A rapid application developer system is disclosed that provides a development platform configured to generate an application manifest document for developing a new target application within a certain industry. The application manifest is generated based on components identified from previously developed applications within the same industry as the target application.

18 Claims, 30 Drawing Sheets

(56) References Cited

U.S. PATENT DOCUMENTS

| | | | |
|---|---|---|---|
| 2007/0250769 A1* | 10/2007 | Bass | G06F 17/243 715/234 |
| 2007/0250783 A1* | 10/2007 | Wu | G06F 17/243 715/762 |
| 2009/0138589 A1* | 5/2009 | Wunderlich | G06F 16/958 709/224 |
| 2009/0217146 A1* | 8/2009 | Goldfarb | G06F 8/38 715/205 |
| 2009/0254391 A1* | 10/2009 | Sarkar | G06Q 10/06 717/101 |
| 2010/0037235 A1* | 2/2010 | Larimore | G06F 9/455 719/312 |
| 2010/0174974 A1* | 7/2010 | Brisebois | G06Q 10/00 715/223 |
| 2011/0022603 A1* | 1/2011 | Khader | G06F 8/65 707/748 |
| 2011/0113364 A1* | 5/2011 | Neil | G06F 3/0482 715/802 |
| 2012/0124554 A1* | 5/2012 | Tam | H04L 67/02 717/121 |
| 2013/0159892 A1* | 6/2013 | Suraj | G06F 3/048 715/762 |
| 2013/0339925 A1* | 12/2013 | Nucci | G06F 8/10 717/105 |
| 2014/0075413 A1* | 3/2014 | Binjrajka | G06F 8/71 717/121 |
| 2014/0108971 A1* | 4/2014 | No | G06F 3/0482 715/762 |
| 2014/0109072 A1* | 4/2014 | Lang | G06F 8/52 717/168 |
| 2014/0173683 A1* | 6/2014 | Zhang | G06F 21/31 726/1 |
| 2014/0372533 A1* | 12/2014 | Fu | G06F 9/5072 709/204 |
| 2015/0074546 A1* | 3/2015 | Slawson | G06F 3/0484 715/747 |
| 2015/0106784 A1* | 4/2015 | Tzubary | G06F 8/36 717/109 |
| 2015/0128105 A1* | 5/2015 | Sethi | G06F 8/36 717/106 |
| 2015/0186132 A1* | 7/2015 | Oliveri | G06F 8/34 717/120 |
| 2015/0234557 A1* | 8/2015 | Dorn | G06F 8/24 715/803 |
| 2015/0248226 A1* | 9/2015 | Kumar | G06F 3/04847 715/747 |
| 2015/0350443 A1* | 12/2015 | Kumar | G06Q 30/016 379/265.13 |
| 2016/0019199 A1* | 1/2016 | Thomson | G06F 8/20 715/220 |
| 2016/0054981 A1* | 2/2016 | Cao | G06F 8/34 717/109 |
| 2016/0070680 A1* | 3/2016 | Wagner | G06F 16/95 715/234 |
| 2016/0092179 A1* | 3/2016 | Straub | G06F 8/71 717/107 |
| 2016/0216947 A1* | 7/2016 | Hassibi | G06F 8/31 |
| 2017/0147364 A1* | 5/2017 | Shaposhnikov | G06F 17/248 |
| 2017/0236067 A1* | 8/2017 | Tjiong | G06F 8/34 706/11 |
| 2017/0242559 A1* | 8/2017 | Pepper | G06F 9/44505 |
| 2017/0315713 A1* | 11/2017 | Pennell | G06F 3/017 |

\* cited by examiner

Figure 19

METHOD AND SYSTEM FOR VISUAL REQUIREMENTS AND COMPONENT REUSE DRIVEN RAPID APPLICATION COMPOSITION

CROSS-REFERENCE TO RELATED APPLICATION(S)

This application claims priority to Indian non-provisional patent application No. 201641021701, filed Jun. 24, 2016, the entirety of which is incorporated by reference herein.

BACKGROUND

Applications have been developed to achieve tasks with automation and efficiency that were not available previously. Applications may be developed across various different industries to help control systems and introduce efficiencies. With increasing computing capabilities and data storage capabilities, applications are becoming more complex in order to achieve more complex tasks. However, relying on a human application developer to create such applications on their own may be overly burdensome on the human application developer and open for human errors.

DESCRIPTION OF THE FIGURES

FIG. 19 shows an exemplary table representation of a candidate component list of the rapid application developer system.

DETAILED DESCRIPTION

Figure 1:
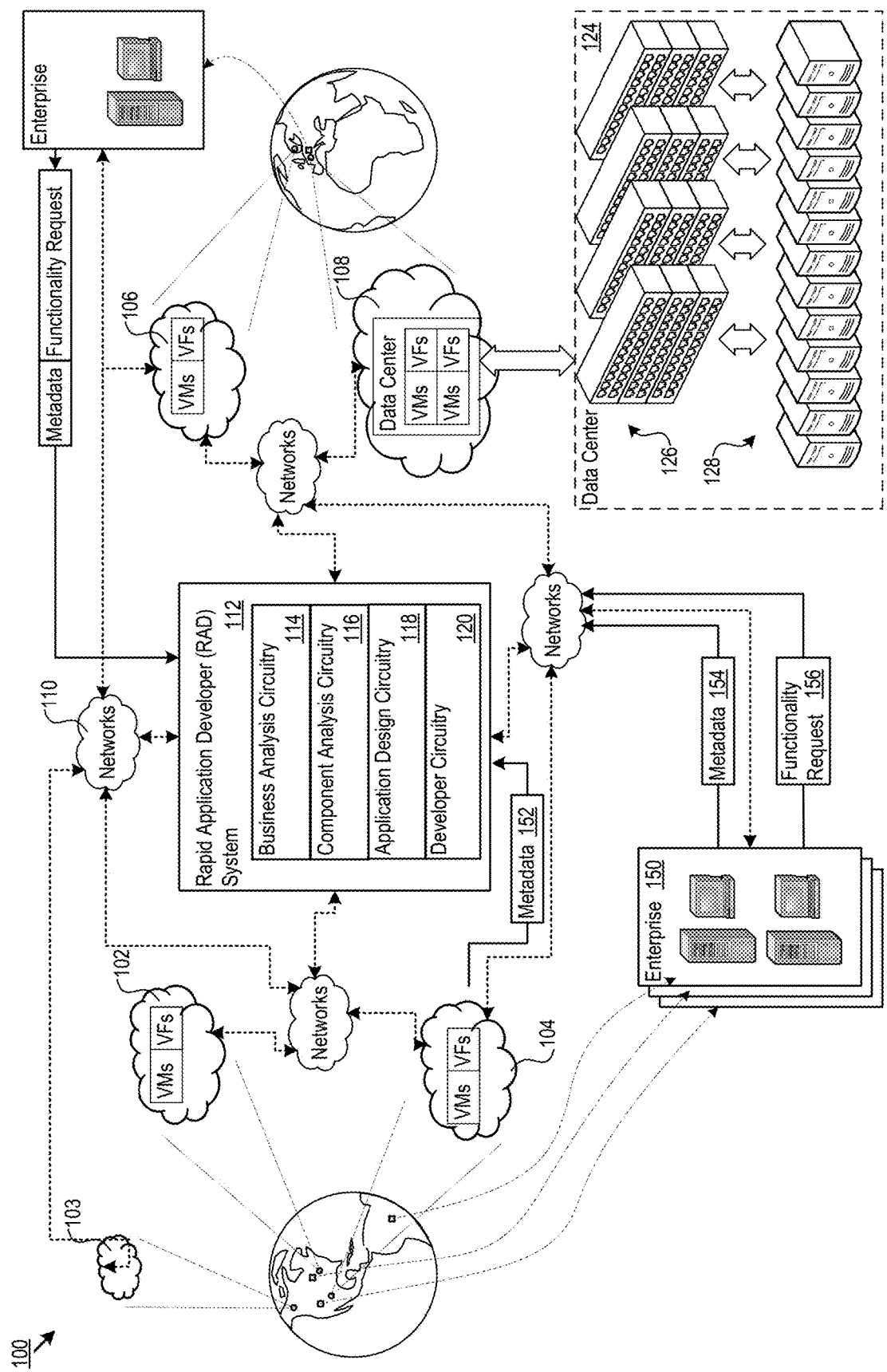
FIG. 1 shows exemplary global network architecture.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

With the increasing reliance on applications to control electronic systems and accomplish tasks that involve electronic devices, there is a corresponding increase in demand for developers to create such applications. In particular, enterprise applications have become an important technological asset for entities to help run their operations. An enterprise application may be developed to provide control over certain automated systems to achieve business goals of the entity. An enterprise application may, for example, be developed to provide a web-based portal that tracks a user's work performance by tracking the user's activities on their device after the user logs into the web-based application.

Now, within a given industry, numerous different applications may have been previously developed that accomplish a particular task. Each of these previously developed applications may operate by presenting information and functional capabilities on one or more application screens (i.e., graphical user interfaces), where each application screen may include one or more application components (hereinafter reference may be made to application components or modules interchangeably). An application components may be used to present information to users, such as a data chart component. An application component may also be used to receive information from users, such as a hierarchical pull down menu that allows users to select available options from the hierarchical pull down menu.

In an effort to achieve, at least, improved efficiencies when developing a new target application, a rapid application developer system ("RAD system") is disclosed that takes advantage of application components that have been previously created for previously developed applications. The RAD system is an automated developer that is able to generate an application manifest that includes instructions for developing a target application requested by a user. The instructions included in the application manifest may be determined based on application component information extracted from previously developed applications that belong to a same, or similar, industry as the target application requested by the user. The RAD system is able to decrease application development time by reusing existing components from previously developed applications, and using computing capabilities to quickly implementing pretotyping and designing the new application.

In particular, the RAD system may have access to a catalog database storing previously developed applications that span across many different industries. The RAD system may then access the catalog database to parse application screens of the previously developed applications to identify one or more components from the parsed application screens. For example, U.S. patent application Ser. No. 14/790,534 titled "Test Case Generation System," the entirety of which are hereby incorporated by reference herein, describes a process for identifying requirements from graphical user interfaces that include interactive wireframes. The identified application components may then be used to design an application framework that describes the target application requested by the user. A menu of candidate components may further be determined and presented to the user through an application composition graphical user interface. After finalizing the application framework, the RAD system may generate an application manifest, where the application manifest includes instructions for developing the target application according to the design described by the application framework. The application manifest may be generated in a standardized structure so that another device with access to the RAD system may receive the application manifest and build the target application according to the application framework described by the application manifest.

It follows that the RAD system includes various development tools for receiving a user's target application requirements, analyzing previously developed applications related to the target application, generate an application composition graphical user interface for creating the application framework, and generating an application manifest that includes instructions for developing the target application according to the application framework described by the application manifest.

For exemplary purposes, the RAD system is described as being a web-based application. A web-based application is generally understood to be an application stored and configured to operate, at least in part, on a web server accessible to other communication devices connected to a common communication network. A user operating their communication device may communicate with the web-server through the common communication network to access and operate the web-based application. The web-based application offers many advantages, such as accessibility to remote users, based on its framework being stored on a web server(s). In addition or alternatively, the RAD system may also be a local application running and accessible on a local device. For exemplary purposes, the RAD system is described as generating the application manifest for creating an enterprise application. An enterprise application may, for example, be an application developed to achieve an identified business goal. Enterprise applications may include both web-based applications that are hosted on a web server and accessible by remote devices through a common communication network, as well as local applications that are stored and accessible on local devices, or some combination thereof.

The RAD system may include a database that stores sample application screens and other graphical user interfaces (GUIs) from previously developed applications, as well as data (e.g., pretotypes) that describes components and other features of previously developed applications. The RAD system may access the database to search for and select GUIs and/or component information based on received information identifying a target application and/or target application requirements.

These and other features of the RAD system are described in this disclosure.

FIG. 1 illustrates a global network architecture 100. The global network architecture 100 may also be referred to as the cloud system at other parts of this disclosure. Distributed through the global network architecture 100 are cloud computing service providers, e.g., the service providers 102, 103, 104, 106, and 108. The service providers may be located in any geographic region, e.g., United States (US) East, US West, or Central Europe. The geographic regions that characterize the service providers may be defined according to any desired distinctions to be made with respect to location. A service provider may provide cloud computing infrastructure in multiple geographic locations for the global network architecture 100.

The service providers may provide computing resources via platforms that are generally publicly available. Service providers may additionally or alternatively provide computing resources "on-premises", which typically refers to a location with increased privacy and security compared to public cloud resources. An on-premise location may be within a secure facility owned by an enterprise which has moved computing functionality to a cloud based implementation, for instance. Examples of service providers include Amazon, Google, Microsoft, and Accenture, who offer, e.g., Amazon Web Services (AWS), Google Compute Engine (GCE), Microsoft Azure (Azure), Accenture Cloud Platform (ACP), and Windows Azure Pack (WAP) for on-premise cloud implementations, as just a few examples.

Throughout the global network architecture 100 are networks, e.g., the network 110, which provide connectivity within the service providers, and between the service providers and other entities within the global network architecture 100. The networks, including network 110, may include private and public networks defined over any predetermined and possibly dynamic internet protocol (IP) address ranges. The RAD system 112 included within the global network architecture 100, makes complex cloud architectural provisioning and execution decisions across multiple cloud services. The RAD system 112 takes into account the global network architecture 100, the various service provider locations and capabilities, and other factors when operating to achieve the recognized operational goals, as described in more detail below.

As an overview, the RAD system 112 may include business analysis circuitry 114 configured to include the hardware, software, firmware, and/or middleware for implementing the features accountable to the business analysis circuitry 114 as described herein. The RAD system 112 may also include a component analysis circuitry 116 configured to include the hardware, software, firmware, and/or middleware for implementing the features accountable to the component analysis circuitry 116. The RAD system 112 may also include an application design circuitry 118 configured to include the hardware, software, firmware, and/or middleware for implementing the features accountable to the application design circuitry 118. The RAD system 112 may also include a developer circuitry 120 configured to include the hardware, software, firmware, and/or middleware for implementing the features accountable to the developer circuitry 120. Each of the business analysis circuitry 114, component analysis circuitry 116, application design circuitry 118, and the developer circuitry 120, may be part of a liquid application portal configured to provide a graphical user interface for implementing the features described herein.

Exemplary operational goals may include system automation tasks within the global network architecture 100, such as, but not limited to: VMware NSX Network Configuration, Windows and Linux Operating System Deployment (VMware), Host configuration including firewalls and networking, Software installation (Oracle RAC, SQL Server, WAS, Custom), Automated system integration (Application server to database), Concurrent builds as driven by data, Build versioning across the entire RAD system 112, and Hardening (DoD STIG) implementation.

The RAD system 112 may interact with virtual machines/servers/Operation Systems (OS) within the global network architecture 100. Further, actions taken by the RAD system 112 may be influenced by many technical factors, including metadata collected from various sources within the global network architecture 100, including service provider metadata 152 that describes service provider offerings and capabilities, and enterprise metadata 154 that describes the cloud functionality requests 156 made to the RAD system 112 by the enterprise 150, and the service requirements (e.g., PCI data compliance) for the functionality requests made by the enterprise 150. Each of the data, metadata, requirements, and requests received by the RAD system 112 may be stored, at least in part, on a database that is part or, or accessible by, the RAD system 112.

In its role as the architect for maintaining the global network architecture 100, the RAD system 112, analyzes cloud service requests and makes decisions about implementation and provisioning of the requested services. This technical role is a complex one, due in part to the disparate cloud computing services offered by each service provider. That is, each service provider has a widely varying set of technical characteristics.

For instance, FIG. 1 shows a particular data center 124 for the service provider 108 running many different virtual machines (VMs), each running many different virtual functions (VFs). The data center 124 may include a high density array of network devices, including routers and switches 126, and host servers 128. The host servers 128 support a unique set of computing functionality offered by the service provider 108 from the data center 124. As just one of many examples, the service provider 108, through the data center 124 and its other infrastructure, may support many different types of virtual machines, differing by number of processors, amount of RAM, and size of disk, graphics processors, encryption hardware, or other properties; multiple different types of web front ends (e.g., different types and functionality for websites); several different types of database solutions (e.g., SQL database platforms); secure data storage solutions, e.g., payment card industry (PCI) data (or any other secure data standard) compliant storage; several different types of application servers; and many different types of data tiers. Further, the service provider 108 and the data center 124 may have further characteristics for the RAD system 112 to analyze, including whether the data center 124 is an on-premise or public location; which networks can provide connectivity to the data center 124; which assets the service provider 108 supports; and other characteristics.

Figure 2:
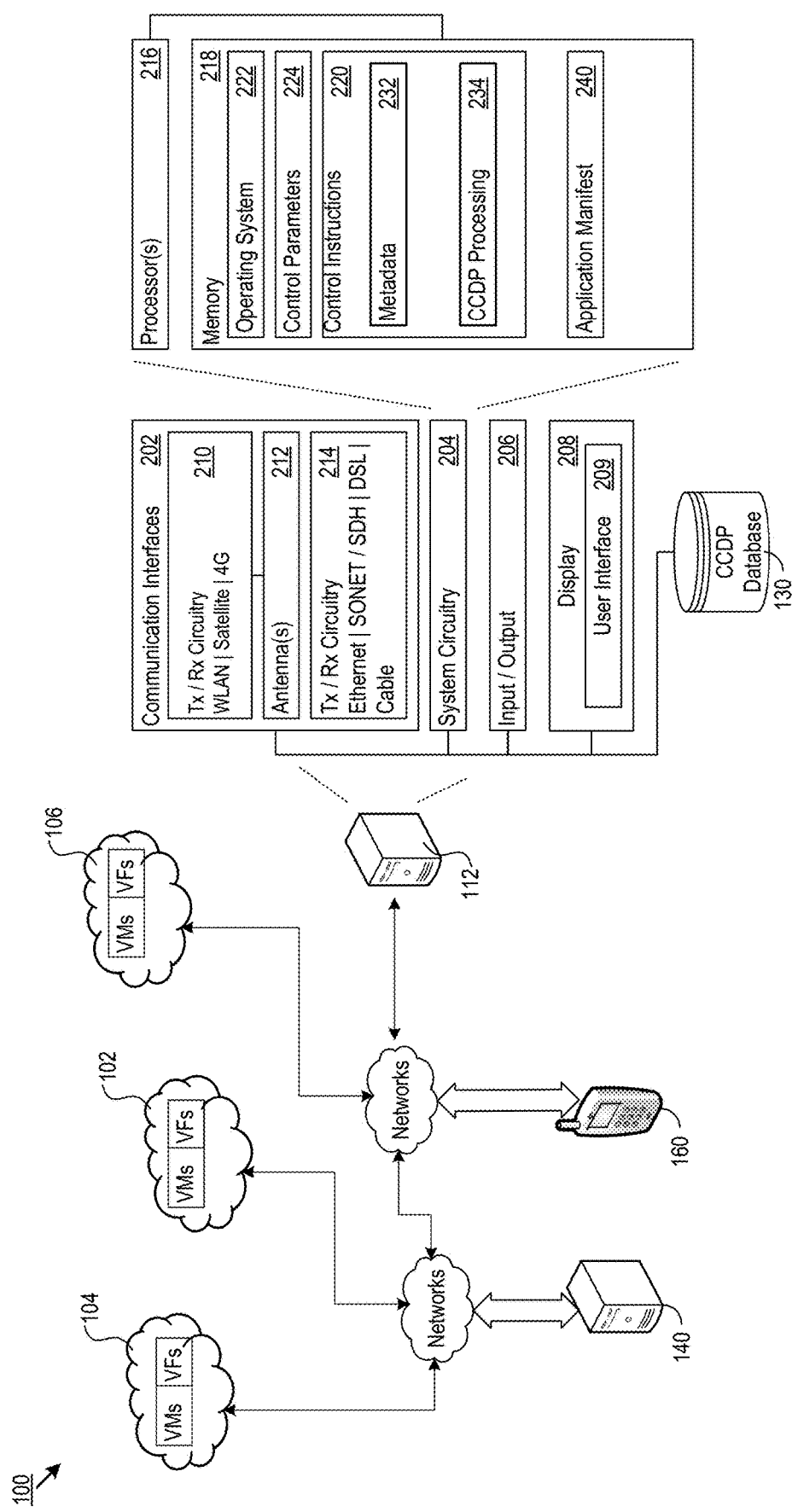
FIG. 2 shows an exemplary implementation of a rapid application developer system within the global network architecture.

FIG. 2 shows an exemplary embodiment of the RAD system 112 configured to execute complex cloud architectural provisioning and execution decisions across multiple cloud services within the global network architecture 100. The RAD system 112 includes communication interfaces 202, system circuitry 204, input/output interfaces 206, and a display 208 on which the RAD system 112 generates a user interface 209.

The user interface 209 and the input/output interfaces 206 may include a graphical user interface (GUI), touch sensitive display, voice or facial recognition inputs, buttons, switches, speakers and other user interface elements. Additional examples of the input/output interfaces 206 include microphones, video and still image cameras, headset and microphone input/output jacks, Universal Serial Bus (USB) connectors, memory card slots, and other types of inputs. The input/output interfaces 206 may further include magnetic or optical media interfaces (e.g., a CDROM or DVD drive), serial and parallel bus interfaces, and keyboard and mouse interfaces. According to some embodiments, the user interface 209 may prompt a user (e.g., cloud system administrator) to input data into the RAD system 112 such as target application requirements. The user may then input data through the input/output interfaces 206 to be stored on memory 218.

The communication interfaces 202 may include wireless transmitters and receivers ("transceivers") 210 and any antennas 212 used by the Tx/Rx circuitry of the transceivers 210. The transceivers 210 and antennas 212 may support WiFi network communications, for instance, under any version of IEEE 802.11, e.g., 802.11n or 802.11ac. The communication interfaces 202 may also include wireline transceivers 214. The transceivers 214 may provide physical layer interfaces for any of a wide range of communication protocols, such as any type of Ethernet, data over cable service interface specification (DOCSIS), digital subscriber line (DSL), Synchronous Optical Network (SONET), or other protocol.

The system circuitry 204 may include any combination of hardware, software, middleware, firmware, or other logic. The system circuitry 204 may be implemented, for example, with one or more systems on a chip (SoC), application specific integrated circuits (ASIC), microprocessors, discrete analog and digital circuits, and other circuitry. The system circuitry 204 is part of the implementation of any desired functionality in the RAD system 112. As just one example, the system circuitry 204 may include one or more instruction processors 216 and memories 218. The memory 218 stores, for example, control instructions 220 and an operating system 222. The control instructions 220 may include, for example, a RAD system processing block 234 that includes the instructions (e.g., software) for operating components of the RAD system 112. For example, the RAD system processing block 234 may include instructions for controlling the business analysis circuitry 114, the component analysis circuitry 116, the application design circuitry 118, the developer circuitry 120, or other components of the RAD system 112 described herein. The processor 216 executes the control instructions 220 and the operating system 222 to carry out any desired functionality for the RAD system 112. The control parameters 224 provide and specify configuration and operating options for the control instructions 220, operating system 222, and other functionality of the RAD system 112. The memory 218 may also store application manifests 240 that are generated by the RAD system 112.

The RAD system 112 also includes storage devices (e.g., hard disk drives (HDDs) and solid state disk drives (SDDs)). For instance, the storage devices may define and store databases that the control instructions 220 accesses, e.g., through a database control system, to perform the functionality implemented in the control instructions 220. In the example shown in FIG. 2, the databases are represented by RAD database 130. RAD database 130 may store, for example, data representing previously developed applications, image data representing a screen shot from previously developed applications, component metadata that describes components that may be identified as being included in the screen shots from the previously developed applications, and other information referenced by the RAD system 112. Each database in the RAD system 112 may define tables storing records that the control instructions 220 and RAD system processing 234 read, write, delete, and modify to perform the processing noted below.

FIG. 2 further shows a first communication device 140 and a second communication device 160 connected to common networks with the RAD system 112. This design allows for the RAD system 112 to communicate with the first communication device 140 and the second communication device 160, and vice versa, through the common networks. The first communication device 140 and the second communication device 160 may include well known computing systems, environments, and/or configurations that may be suitable for implementing features of the RAD system 112 such as, but are not limited to, smart phones, tablet computers, personal computers (PCs), server computers, handheld or laptop devices, multiprocessor systems, microprocessor-based systems, network PCs, server computers, minicomputers, mainframe computers, embedded systems, distributed computing environments that include any of the above systems or devices, and the like.

To access the RAD system 112, a user may open a local browser of the liquid application portal on their communication device (e.g., first communication device 140 or second communication device 160). The liquid application portal may be executed on the user's communication device to access the RAD system 112 and interact with the RAD system 112, as described in further detail herein.

Figure 3:
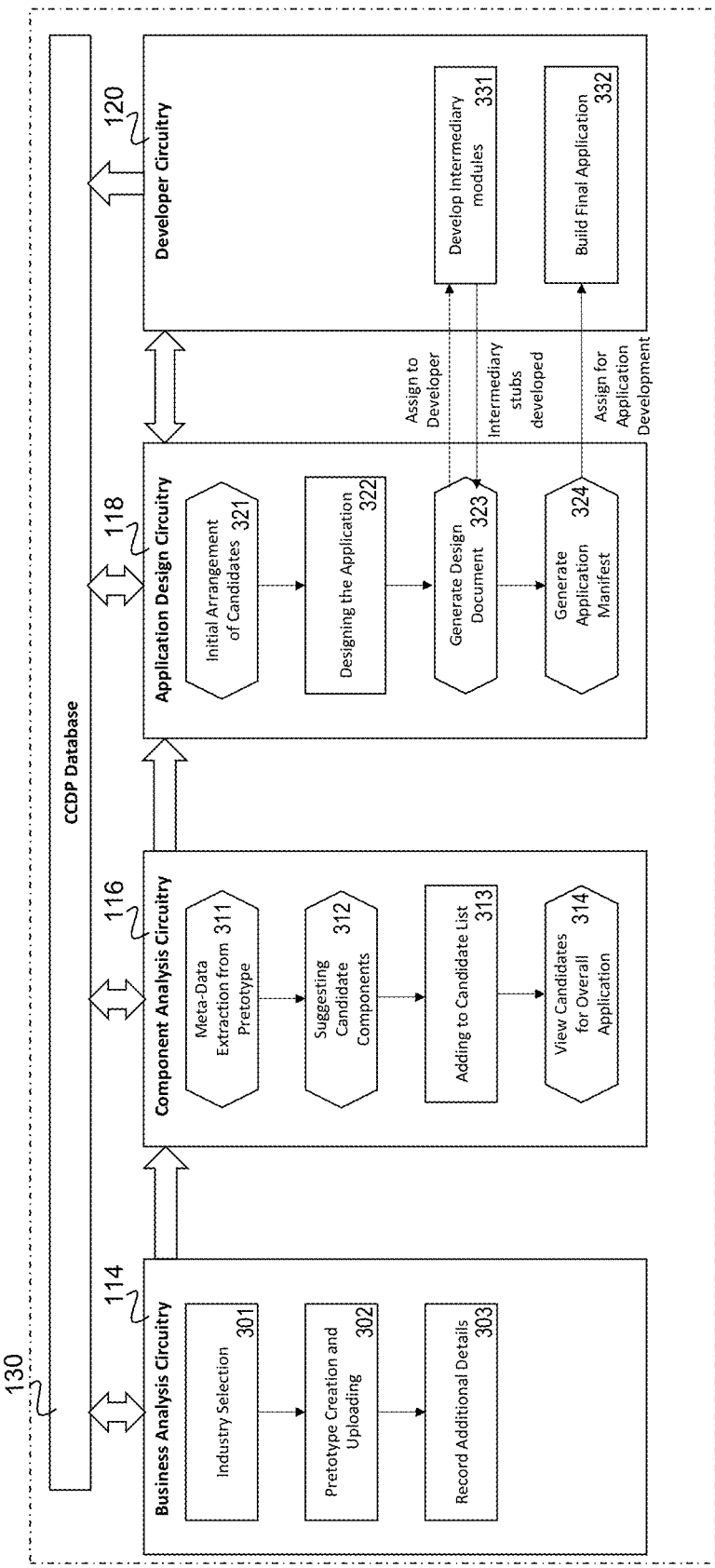
FIG. 3 shows an exemplary block diagram that includes exemplary components and a flow chart of logic that may be implemented by the rapid application developer system.

FIG. 3 shows an exemplary block diagram 300 that includes exemplary components and a flow chart of logic that may be implemented by the RAD system 112. Block diagram 400 shows the business analysis circuitry 114, the component analysis circuitry 116, the application design circuitry 118, the developer circuitry 120, and the RAD database that have been described as being included in the RAD system 112. Within the blocks representing the business analysis circuitry 114, the component analysis circuitry 116, the application design circuitry 118, and the developer circuitry 120, block diagram 400 also shows an exemplary flow of logic that may be implemented by the RAD system 112 to implement specific processes for generating a target application. For example, the business analysis circuitry 114 is shown to include a flow chart of logic that includes processes (301) to (303). The component analysis circuitry 116 is shown to include a flow chart of logic that includes processes (311) to (314). The application design circuitry 118 is shown to include a flow chart of logic that includes processes (321) to (324). The developer circuitry 120 is shown to include a flow chart of logic that includes processes (331) to (332).

Figure 4:
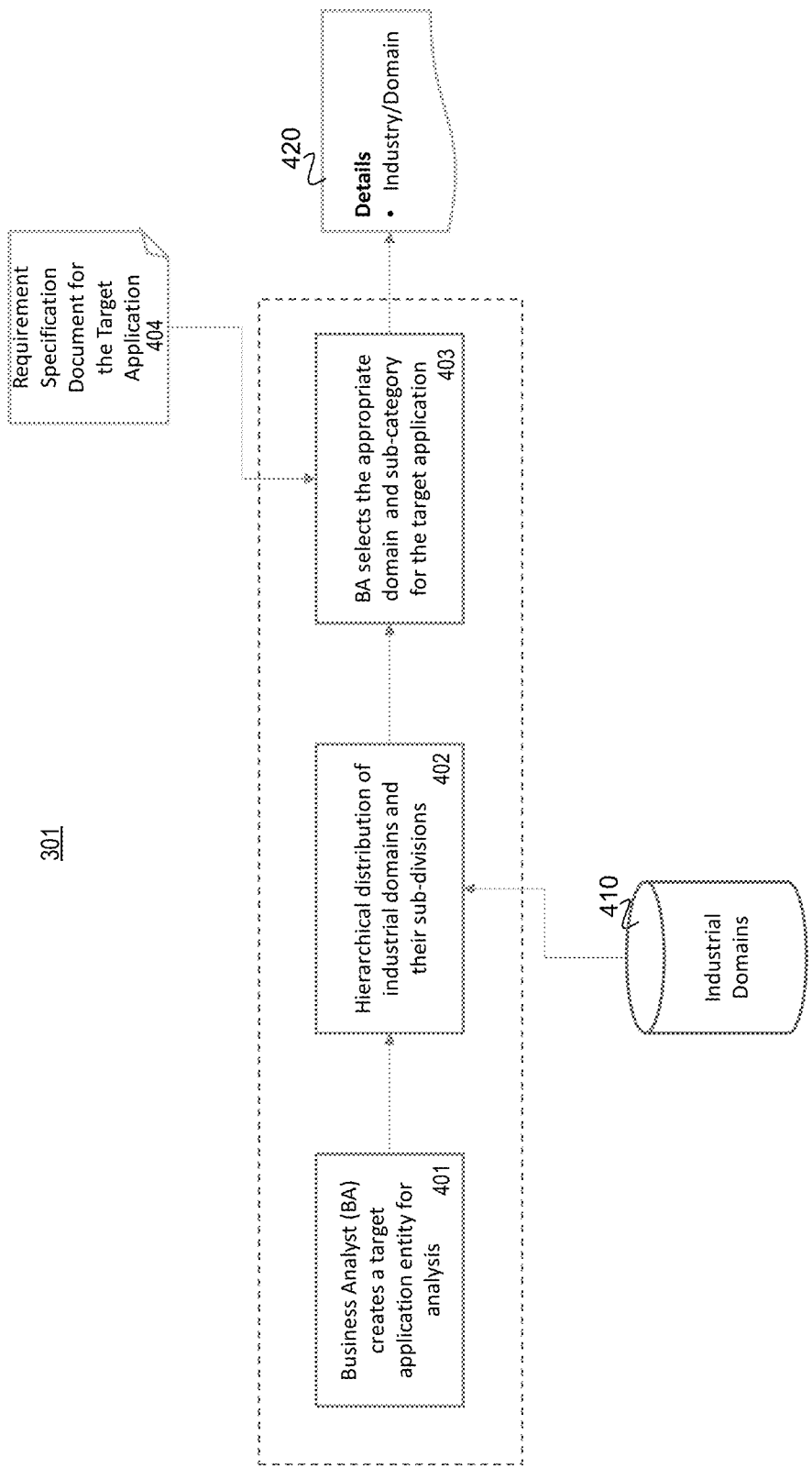
FIG. 4 shows a flow chart of logic describing processes that the rapid application developer system may implement.

FIG. 4 shows a flow chart of logic describing processes that may be included to implement process (301) attributed to the business analysis circuitry 114 for selecting an industry of a target application.

A user (e.g., a user of the liquid application portal) may create a target application entity (hereinafter the "target application") for analysis by the RAD system (401). Creating the target application may include assigning a name for the target application based on the user's input, assigning a description for the target application based on the user's input, identifying a start date based on the user's input, identifying a development status for the target application based on the user's input, and identifying an action status for the target application based on the user's input. The user may also identify themselves according to one of a number of difference available roles. Exemplary roles include business analyst, component analyst, composer, developer, administrator, cloud administrator. For exemplary purposes, the user is described as selecting the business analyst (BA) role.

The user may further navigate a hierarchical distribution of industrial domains and their subdivisions to select an industry to which the target application relates to (402). The business analysis circuitry 114 may determine the industrial domains and their subdivisions that are presented to the user in the hierarchical distribution based on the user's selected role. The industrial domain information included in the hierarchical distribution may be retrieved by the business analysis circuitry 114 from an industrial domains database 410. The industrial domains database 410, for example, may be included as part of the RAD database 130 of the RAD system 112.

The business analysis circuitry 114 may further receive the user's selection of the industry for the target application from the industrial domains presented through the hierarchical distribution (403). A requirement specification document for the selected industry may further be received by the business analysis circuitry 114 at (403). The requirement specification document includes a set of predetermined application rules and/or requirements that have been determined to apply to applications that have been developed in the selected industry. The predetermined application rules and/or requirements may include, for example, information describing the main functionality of the target application, information describing the underlying technology of the target application, information describing a platform of deployment of the target application, information describing whether any additional requirements are needed from the user's end, and information describing tool specification for the target application. The requirement specification document may further include categorization information describing an industry/domain for categorizing the target application.

From the processes described as being included at (301), the business analysis circuitry 114 may determine the industry of the target application. The determined industry information from the processes included in (301) may be stored as industry information 420.

Figure 5:
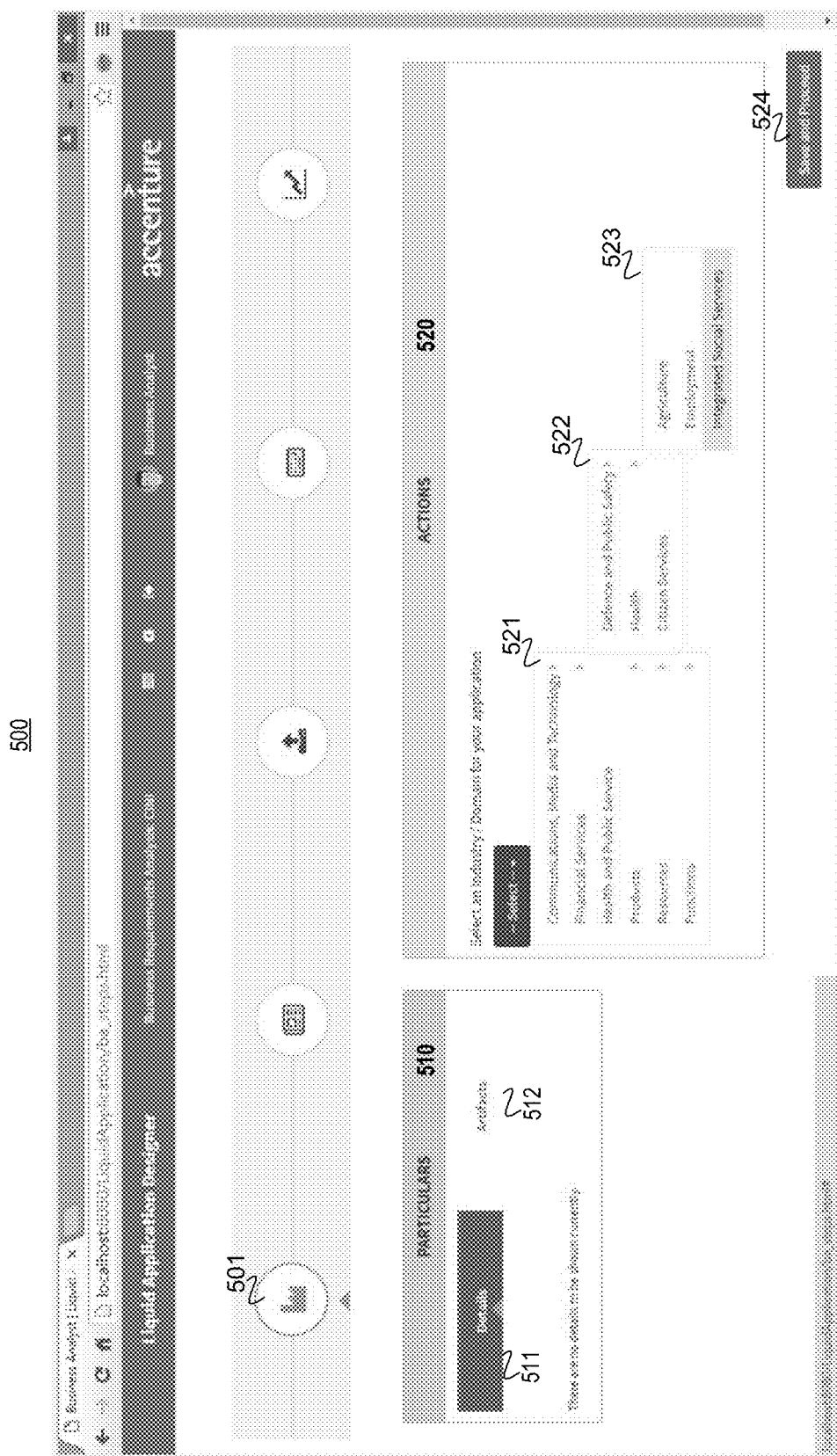
FIG. 5 shows an exemplary application composition graphical user interface of the rapid application developer system.

An exemplary first GUI 500 is shown in FIG. 5, where the first GUI 500 corresponds to an operation of the business analysis circuitry 114 within the liquid application portal for implementing at least some of the processes included at (301). The first GUI 500 includes a navigation menu that may include an industry tab 501, a bootstrap prototype tab, an upload pretotype tab, a technology tab, and a record NFR (non-functioning requirements) tab. The first GUI 500 is illustrated as having the industry tab 501 highlighted to indicate a process for selecting an industry for the target application corresponding to the process at (301). The first GUI 500 also includes a particulars section 510 and an actions section 520. The particulars section 510 includes an option for selecting an artifacts option 512, where selection of the artifacts option 512 causes the business analysis circuitry 114 to display artifacts relating to the selected industry. The artifacts option 512 may be selected by the user controlling a selection tool (e.g., pointer icon) within the liquid application portal. The particulars section 510 also includes a details option 511 that displays information describing the selected industry. The details option 511 may be selected by the user controlling the selection tool within the liquid application portal.

Artifacts, as described herein, describes entities that are obtained throughout the course of the process for generating the target application. For example, the business analysis circuitry 114 may obtain artifacts in the form pretotype files, pretotype screen images, or navigation images. The component analysis circuitry 116 may obtain artifacts in the form of meta-data extracted from pretotype screens or candidate lists. Other artifacts may be obtained during the execution of processes by the application design circuitry 118 and developer circuitry 120 as they operate to generate the target application.

The actions section 520 is shown to display an exemplary hierarchical distribution including a first level 521, a second level 522, and a third level 523. The industry information presented in the hierarchical distribution may have been determined based on the BA role selected for the user. In the first level 521, the user is presented with a high level description for potential industries that the target application may apply to. For example, the first level 521 identifies the communications, media, and technology industry, the financial services industry, the health and public service industry, the products industry, the resources industry, and the functions industry. The user is shown to control the selection tool to select the health and public services industry at the first level 521. Based on the selection of the health and public services industry from the first level 521, the liquid application portal is shown to further display the second level 522 that includes the defense and public safety industry, the health industry, and the citizen services industry. The industries presented in the second level 522 are a more detailed presentation of industries that belong to the industry selected from the first level 521. In the first GUI 500 the user is shown to control the selection tool to select the citizen services industry from the second level 522. Based on the selection of the citizen services industry from the second level 522, the liquid application portal is shown to further display the third level 523 that includes the administrator (AESG) industry, the agriculture industry, the customs industry, the child services industry, the postal industry, the education industry, the revenue industry, the employment industry, and the integrated social services industry. The industries presented in the third level 523 are a more detailed presentation of industries that belong to the industry selected from the second level 522. In the first GUI 500 the user is shown to control the selection tool to select the integrated social services industry from the third level 523. In the first GUI 500, the hierarchical distribution is shown to end at the integrated social services industry. However, other industries in the third level 523 such as the child services industry and the education industry are shown to include further levels.

The first GUI 500 further includes a save and proceed option 524. By selecting the save and proceed option 524, the current status and information gathered for the target application may be saved by the liquid application portal. The user may later retrieve the saved target application to begin at the status and with the information saved at the time of selection of the latest save and proceed option 524 by logging into the liquid application portal.

Figure 6:
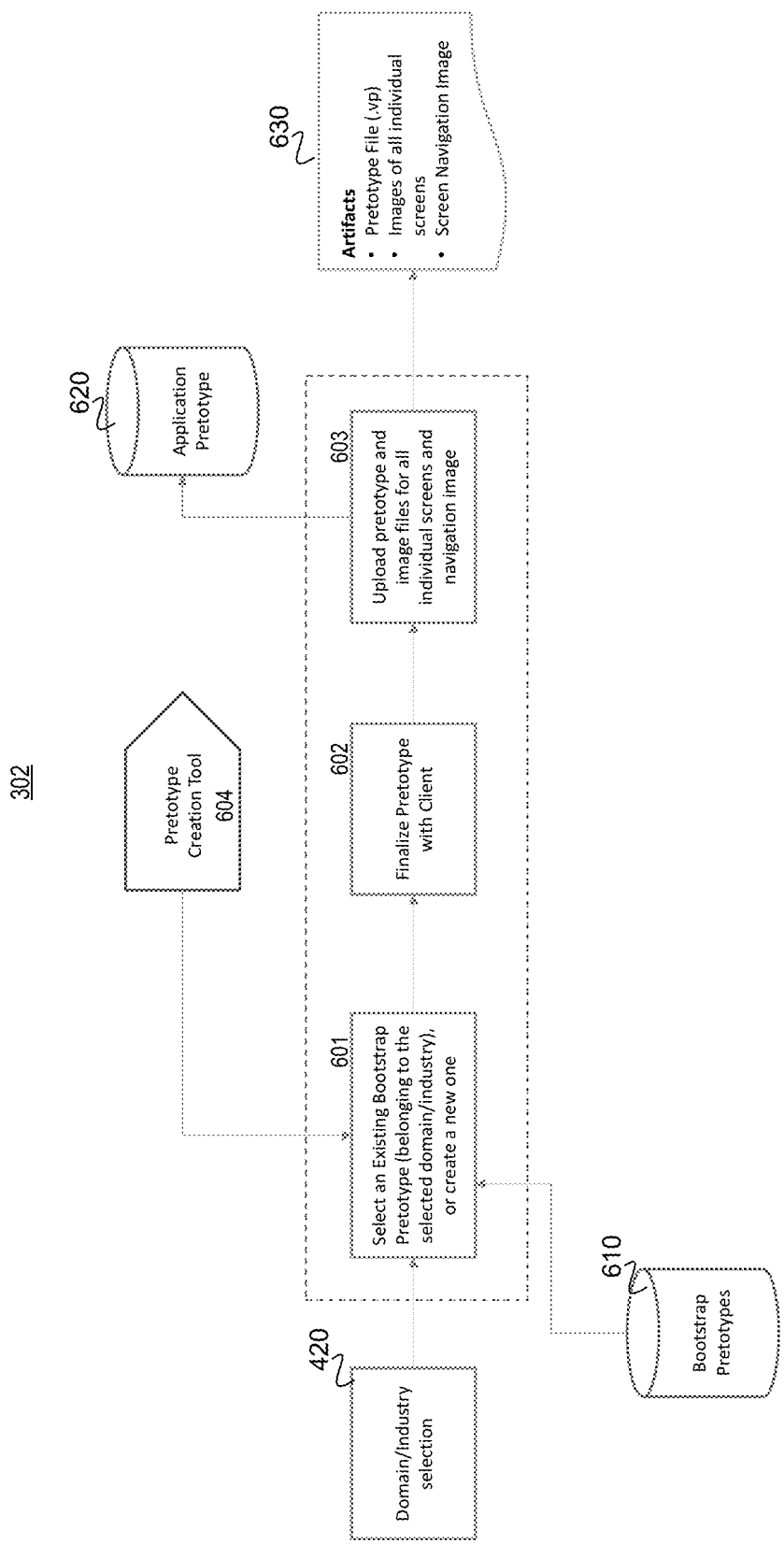
FIG. 6 shows a flow chart of logic describing processes that the rapid application developer system may implement.

FIG. 6 shows a flow chart of logic that may be included in process (302) attributed to the business analysis circuitry 114 for obtaining a pretotype by selecting a pretotype, creating a pretotype, and/or uploading a pretotype. The industry information 420 is shown to be received as an input to the business analysis circuitry 114 for implementing the processes related to process (302).

The business analysis circuitry 114 may receive a command input from the user that selects an existing pretotype belonging to the selected industry, or creates a new pretotype (602). The pretotype may be a data structure, such as a target application model, that includes information that may be used for generating an application manifest for building the target application. For example, the pretotype may include a set of GUI screen images, each with their corresponding GUI elements, built before the development of the target application. The set of GUI screen images may have been obtained from GUI screen images included in previously developed applications that share similarities with the target application. The pretotype may further include application component identifiers describing functional components in the previously developed applications, and navigational flow information describing relationships between different GUI image screens and the rules for navigating between the different GUI image screens for a previously developed application. The information included in the pretotype may correspond to information from one or more different previously developed applications. The pretotype that is presented for selection may belong to the same industry as the industry selected by the user. The pretotype helps in determining the control flow among the different GUI screens of the target application by providing examples of different GUI screens from previously developed applications that are determined to be similar to the target application. If follows that the pretotype offers a visualization for the target application that includes information regarding the screen layouts, data inputs and outputs, and the control flow of the target application.

The pretotype may be retrieved from a bootstrap pretotypes database 610 that stores pretotypes describing previously developed applications according to their assigned industry, where the bootstrap pretotypes database 610 may be included in the RAD database 130. In addition or alternatively, the pretotype may be created as a new pretotype. When the user selects to create a new pretotype, the liquid application portal may provide options for utilizing a pretotype creation tool (e.g., JustinMind) to create the new pretotype.

After selecting a pretotype, the business analysis circuitry 114 may finalize the selected pretotype with the user or other client (602). After finalizing the pretotype, the business analysis circuitry 114 may further upload the pretotype to from its storage location for further consideration by the liquid application portal in gathering information for developing the target application (603). In addition, the liquid application portal may upload image files that describe screen shots of GUIs and navigation images included in the previously developed applications that correspond to the pretotype. The uploaded pretotype may be uploaded from an application pretotype database 620, where the application pretotype database 620 may be included in the RAD database 130. The pretotype and the image information gathered from the processes included at (302) may be stored as artifacts information 630.

The pretotype creation tool (e.g., JustinMind) may be configured to create and save pretotypes as a file with a predetermined extension (e.g., pretotype files may be designated to have the .vp file extension). The pretotype creation tool may further save GUI screen images that are included within the pretotype file under a different file extension designation (e.g., GUI screen images may be designated the .png file extension). Depending on the navigation logic incorporated in the pretotype, the flow of control may be captured and saved in the navigational image file. A pretotype may go through multiple revisions throughout the processes described herein, then once the pretotype has been finalized, additional details may be appended to the pretotype such as technology details and tool specifications. After the business analyst circuitry 114 concludes implementing processes (301)-(303), the business analyst circuitry 114 may forward the pretotype for further review and, if found suitable, the pretotype may be added to the list of bootstrap pretotypes in the bootstrap pretotypes database 610 under the corresponding particular industry/domain. The pretotype files stored in the bootstrap pretotypes database 610 are accessible for reuse by the RAD system 112 to develop future target applications.

Figure 7:
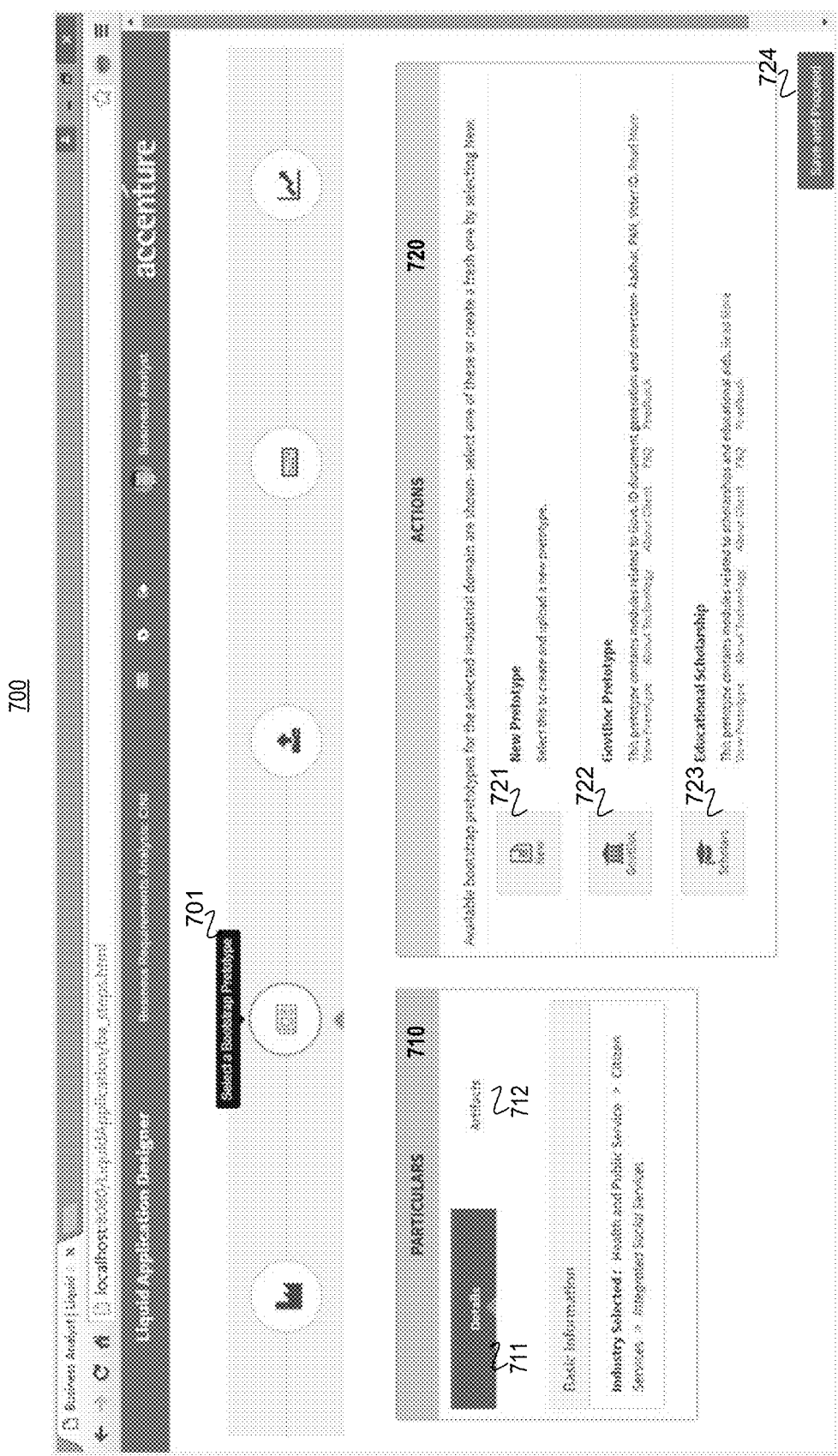
FIG. 7 shows an exemplary application composition graphical user interface of the rapid application developer system.

An exemplary second GUI 700 of the liquid application portal for implementing the process for selecting a pretotype or creating a new pretotype included in process (302) attributed to the business analysis circuitry 114 is shown in FIG. 7. Similar to the first GUI 500, the second GUI 700 includes a navigation menu that includes an industry tab, a bootstrap prototype tab 701, an upload pretotype tab, a technology tab, and a record NFR (non-functioning requirements) tab. The second GUI 700 is illustrated as having the bootstrap prototype tab 701 highlighted to indicate a process for selecting an existing pretotype (e.g., GovDoc pretotype 722 or Educational Scholarships pretotype 723), and/or selecting an option for creating a new pretotype 721. The second GUI 700 also includes a particulars section 710 including a details option 711 and an artifacts option 712, and an actions section 720. The second GUI 700 is shown to have the details option 711 selected, which causes the particulars section 710 to display basic information identifying attributes selected for the target application. For example, the basic information identifies the industry selected for the target application as the health and public service industry, further describes the citizen services, and further describes the integrated social services. The second GUI 700 also includes a save and proceed option 724. By selecting the save and proceed option 724, the current status and information gathered for the target application may be saved by the business analysis circuitry 114. The user may later be retrieved by the user upon log-in to begin at the status and with the information saved at the time of selection of the latest save and proceed option 724.

Figure 8:
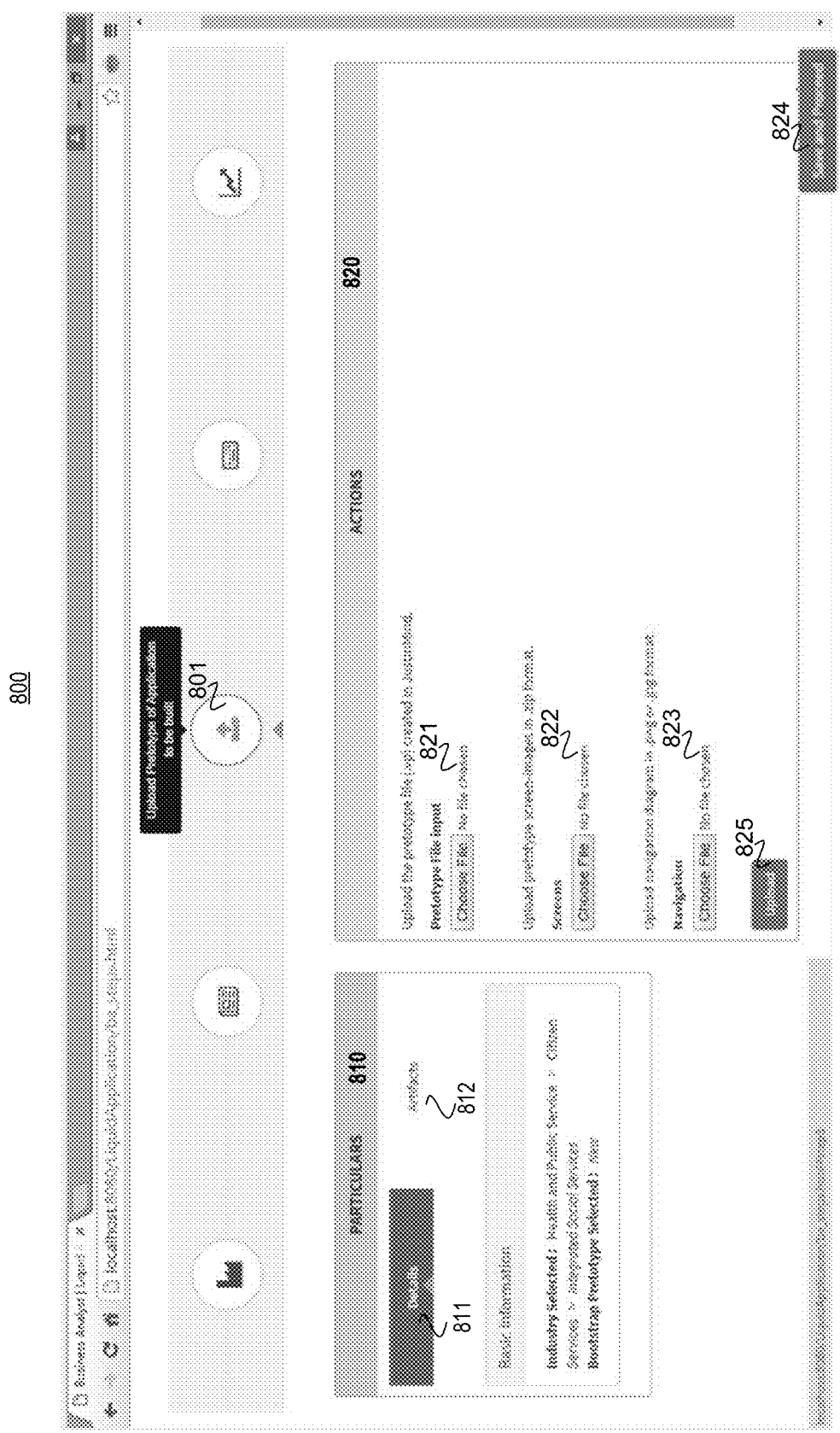
FIG. 8 shows an exemplary application composition graphical user interface of the rapid application developer system.

An exemplary third GUI 800 of the liquid application portal for implementing the process for uploading a pretotype included in process (302) attributed to the business analysis circuitry 114 is shown in FIG. 8. Similar to the first GUI 500, the third GUI 800 includes a navigation menu that includes an industry tab, a bootstrap prototype tab, an upload pretotype tab 801, a technology tab, and a record NFR (non-functioning requirements) tab. The third GUI 800 is illustrated as having the upload pretotype tab 801 highlighted to indicate a process for uploading a selected pretotype. For example, the selected pretotype may have been selected from the options available from the second GUI 700. (e.g., GovDoc pretotype 722 or Educational Scholarships pretotype 723). The third GUI 800 also includes a particulars section 810 and an actions section 820. The actions section 820 includes a pretotype file upload option 821, where the user may select the pretotype file upload option 821 to choose from one or more pretotype files that correspond to the selected pretotype. The pretotype file may be a data format having a .vp extension. The actions section 820 may also include a pretotype screen images upload option 822, where the user may select specific GUI screen images to upload via the pretotype screen images upload option 822. The pretotype screen image may be uploaded in a data format having a .zip extension. The actions section 820 may also include a navigation diagram upload option 823, where the user may select specific navigation diagrams to upload via the navigation diagram upload option 823. The navigation diagram may be uploaded in a data format having a .png or .jpg extension. After selecting the pretotype file, the user may select the upload option 825 to upload the selected pretotype file.

The particulars section 810 includes an artifacts option 812, where selection of the artifacts option 812 will cause the business analysis circuitry 114 to display a list of artifacts corresponding to the uploaded pretotype file. The third GUI 800 shows that the uploaded pretotype file includes six separate screen images, as well as a navigation image that describes how a user may navigate pages of the previously developed application corresponding to the uploaded pretotype file. The particulars section 810 also includes a details option 811 that describes information on the selected industry for the targeted application, as well as information describing the uploaded pretotype file. The third GUI 800 also includes a save and proceed option 824. By selecting the save and proceed option 824, the current status and information gathered for the target application may be saved by the business analysis circuitry 114. The user may later retrieve the saved target application to begin at the status and with the information saved at the time of selection of the latest save and proceed option 824 by logging into the liquid application portal.

Figure 9:
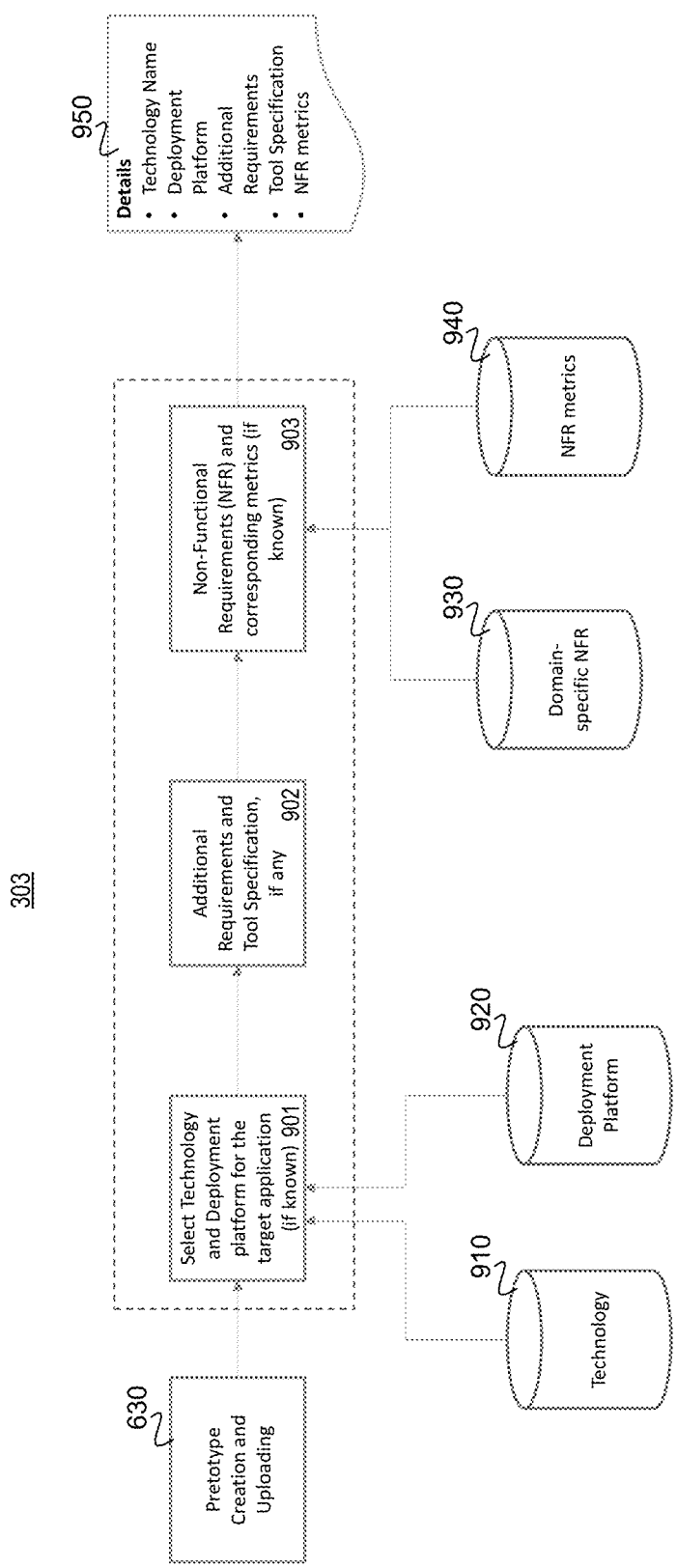
FIG. 9 shows a flow chart of logic describing processes that the rapid application developer system may implement.

FIG. 9 shows a flow chart of logic describing processes that may be implement by the business analysis circuitry 114 for recording additional details that may be referenced in developing the target application, as identified by process (303) in FIG. 3. The artifacts information 630 is shown to be received as an input to the business analysis circuitry 114 for implementing the processes related to process (303).

The business analysis circuitry 114 may present an option for identifying a technology platform and deployment platform for the target application (901). The technology may be a software application framework such as node.js, .NET, python, PHP, Ruby, Go, Swift, Perl, C++, Java, C, or other known software application framework. The deployment platform may be an application deployment platform such as Bluemix PaaS, Heroku, AWS Elastic Beanstalk, MS Azure, Engine Yard, or other known application deployment platforms. The technology platform information may be retrieved from a technology database 910, where the technology database 910 may be included in the RAD database 130. The deployment platform information may be retrieved from a deployment platform database 920, where the deployment platform database 920 may be included in the RAD database 130.

The business analysis circuitry 114 may further present an option for allowing the user to input additional requirements and tool specifications for the target application (902). The additional requirements may describe, for example, the intended user for the target application. The tool specifications may describe, for example, the version specific requirement for tool usage.

The business analysis circuitry 114 may further present an option for allowing the user to input non-functional requirements (NFRs) and corresponding metrics (903). Exemplary NFRs and their corresponding metrics include authentication type (OTP, Facebook Login, Google Login, OAuth, Custom, or other authentication that requires a user login), response time (<100 ms, 100 ms-10 ms, 10 ms-1 s, or some other metric of time), number of end users (<100 users, 100-499 users, 500-1499 users, 1500-4999 users, >=5000 users, or some other range of end users), region of operation (India, North America, South America, Europe, Australia, New Zealand, Africa, or some other defined region).

The NFRs may be retrieved from a domain specific NFR database 930, where the domain specific NFR database 930 may be included in the RAD database 130. The corresponding metric information may be retrieved from a NFR metrics database 940, where the NFR metrics database 940 may be included in the RAD database 130. The gathered information may be stored as details information 950.

Figure 10:
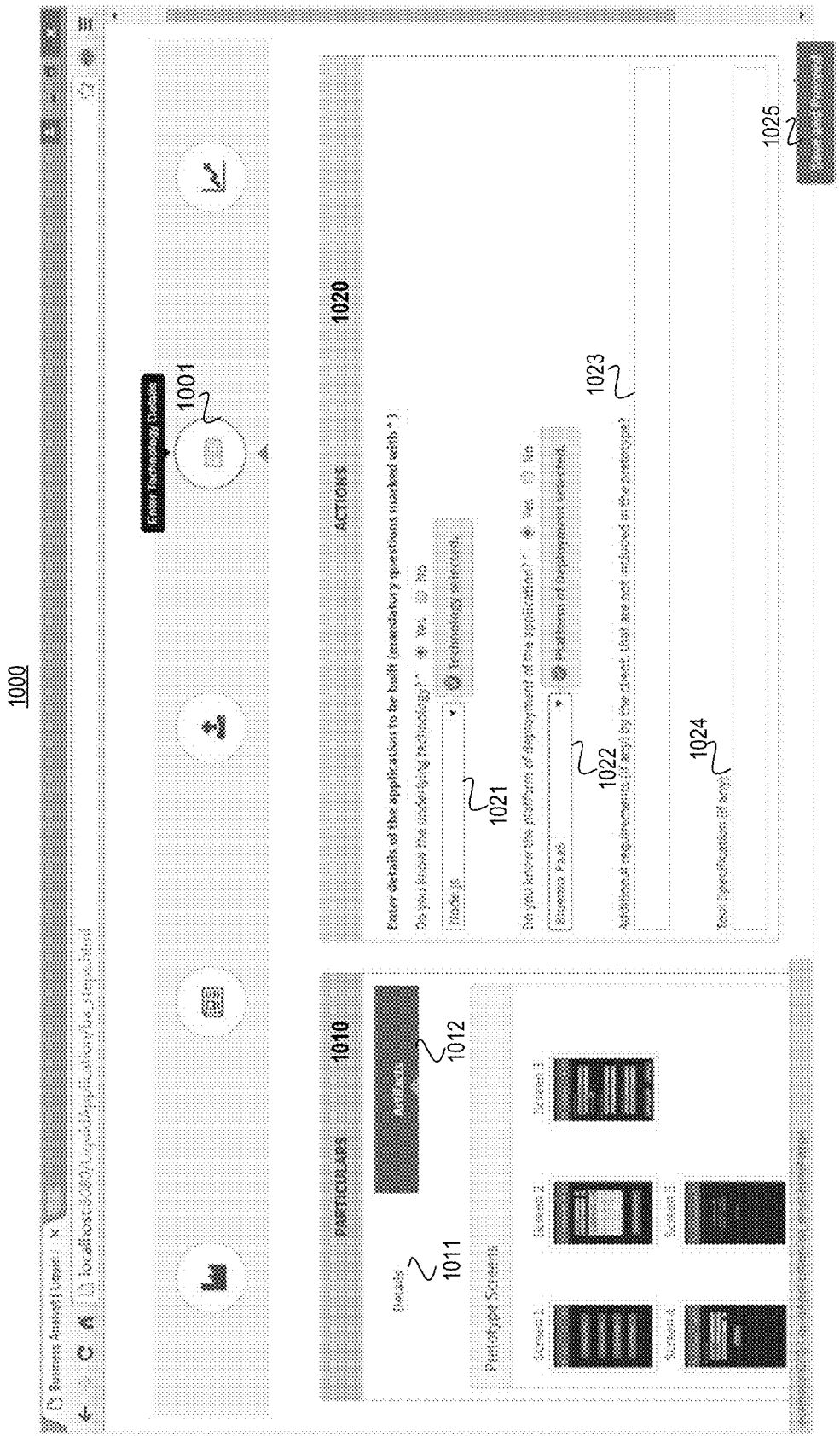
FIG. 10 shows an exemplary application composition graphical user interface of the rapid application developer system.

An exemplary fourth GUI 1000 of the liquid application portal for implementing the process for recording additional details included in process (303) attributed to the business analysis circuitry 114 is shown in FIG. 10. Similar to the first GUI 500, the fourth GUI 1000 includes a navigation menu that includes an industry tab, a bootstrap prototype tab, an upload pretotype tab, a technology tab 1001, and a record NFR (non-functioning requirements) tab. The fourth GUI 1000 is illustrated as having the technology tab 1001 highlighted to indicate a process for recording additional details for developing the target application. The fourth GUI 1000 also includes a particulars section 1010 and an actions section 1020. Within the actions section 1020, the liquid application portal includes an option for the user to input technology platform information for the target application. The technology platform information may be selected from a list of available software application frameworks in which the target application is to be coded. Within the actions section 1020, the liquid application portal may also include an option for the user to input deployment platform information that identifies an application deployment platform in which the target application is intended to be deployed. The deployment platform information may be selected from a list of available application deployment platforms. The actions section 1020 may also include an additional requirements field 1023 that accepts user inputs that describe additional requirements for the target application that are not included in the uploaded pretotype. The actions section 1020 may also include a tool specification field 1024 that accepts user inputs that describe additional tool specifications for the target application that are not included in the uploaded pretotype.

The particulars section 1010 includes a details option 1011 that describes details of the uploaded pretotype, as well as information related to the development of the target application as received through the liquid application portal. The particulars section 1010 also includes an artifacts option 1012, where the selection of the artifacts option 1012 as illustrated in FIG. 10 causes the particulars section 1010 to display pretotype screens included in the selected pretotype.

The fourth GUI 1000 also includes a save and proceed option 1025. By selecting the save and proceed option 1025, the current status and information gathered for the target application may be saved by the liquid application portal. The user may later retrieve the saved target application to begin at the status and with the information saved at the time of selection of the latest save and proceed option 1025 by logging into the liquid application portal.

Figure 11:
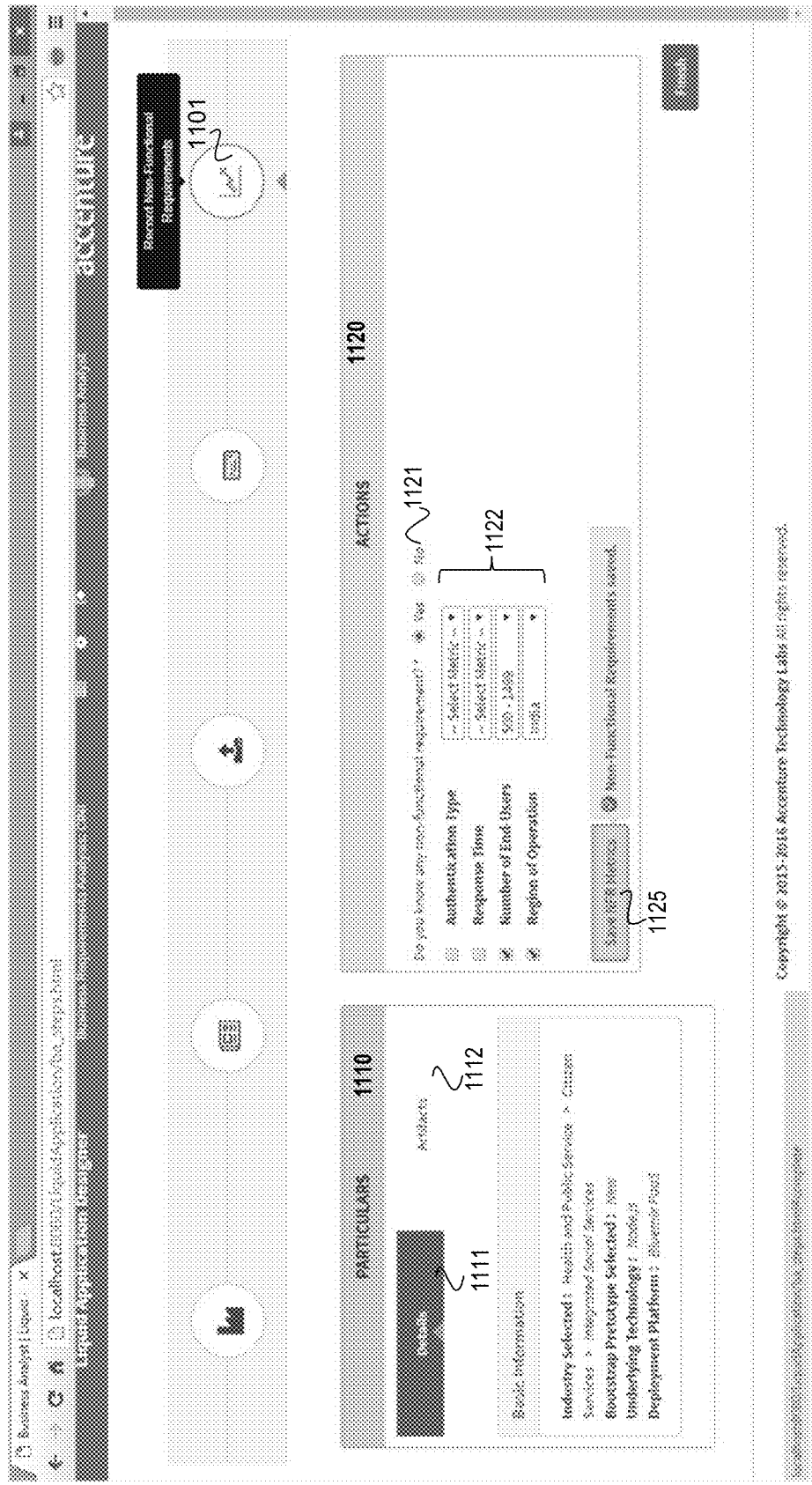
FIG. 11 shows an exemplary application composition graphical user interface of the rapid application developer system.

An exemplary fifth GUI 1100 of the liquid application portal for implementing the process for recording NFRs included in process (303) attributed to the business analysis circuitry 114 is shown in FIG. 11. Similar to the first GUI 500, the fifth GUI 1100 includes a navigation menu that includes an industry tab, a bootstrap prototype tab, an upload pretotype tab, a technology tab, and a record NFR (non-functioning requirements) tab 1101. The fifth GUI 1100 is illustrated as having the record NFR tab 1101 highlighted to indicate a process for recording NFRs for developing the target application. The fifth GUI 1100 also includes a particulars section 1110 and an actions section 1120. Within the actions section 1120, the liquid application portal may include an NFR field 1121 that allows the user to select whether to input NFR information for developing the target application. The fifth GUI 1100 is illustrated to show an embodiment where the user has selected to input NFR information by selecting "Yes" from the NFR field 1121. The actions section 1120 also includes an NFR selection menu 1122 that allows the user to select an NFR from a predetermined menu of available NFR options such as, for example, authentication type, response time, number of end users, and region of operation. The fifth GUI 1100 is illustrated to show an embodiment where the user has selected "Number of End-Users" as the NFR information. The actions section 1120 also includes an NFR data selection field 1123 that includes available data options for the NFR selected from the NFR selection menu 1122. The fifth GUI 1100 is illustrated to show an embodiment where the user has selected "500-1499" as the NFR data related to the number of end-users NFR information.

The particulars section 1110 includes a details option 1111 that, when selected as illustrated in FIG. 11, describes details of the selected NFR, as well as information related to the development of the target application as received through the liquid application portal. The particulars section 1110 also includes an artifacts option 1112 which is not selected according to FIG. 11.

The fifth GUI 1100 also includes a save NFR metrics option 1125. By selecting the save NFR metrics option 1125, the NFR information input from the NFR selection menu 1122 may be saved for the development of the target application by the liquid application portal.

Figure 12:
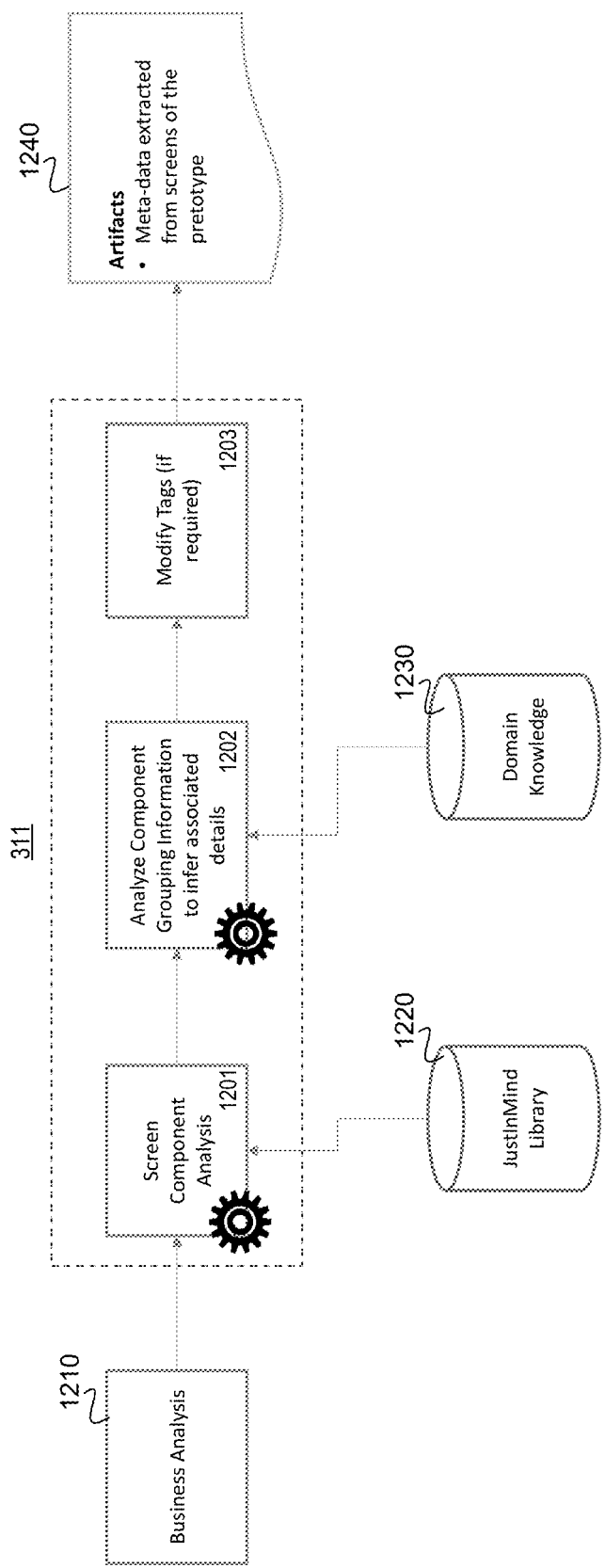
FIG. 12 shows a flow chart of logic describing processes that the rapid application developer system may implement.

FIG. 12 shows a flow chart of logic that may be included to implement process (311) attributed to the component analysis circuitry 116 for selecting an industry of a target application. The information gathered from the business analysis circuitry 114 (e.g., a combination of one or more of the industry information 420, the artifacts information 630, and the details information 850) is received by the component analysis circuitry 116 as an input to the process at (311).

Based on the received business analysis information 1210, the component analysis circuitry 116 may implement an automatic screen component analysis (1201). The screen component analysis at (1201) may include parsing the screen images from the business analysis information 1210, and extracting metadata from the parsed screen images corresponding to the pretypes included in the business analysis information 1210. The metadata may be associated with their respective screen image and describe components that are included in the GUIs depicted in the respective screen image. The metadata may also information describing attributes of the components included in the GUIs depicted in the respective screen images.

The metadata may identify components displayed within the screen images. For example, the metadata may be included with the image data representing the screen images, where the metadata describes components that are displayed within the screen images. The components may include input info, output info, tags, category, textboxes, dropdowns, buttons, GUI widgets, component groups, as well as a corresponding value for the identified component. The component analysis circuitry 116 may further receive information from a pretype creation tool library 1220 (e.g., JustinMind library), where the pretype creation tool library 1220 may be included in the RAD database 130. The JustinMind library may be a Java library configured to iterate over one or more, or all, of the screen images corresponding to a pretype and its individual components (e.g., textboxes, labels, buttons) along with their corresponding values. The JustinMind library further assist to fetch component grouping details within a screen image.

The extracted metadata, and in some embodiments the received business analysis information 1210, may further be analyzed by the business analysis circuitry 114 to automatically analyze component groupings to infer associated details (1202). This means that the identified components from a screen image may be analyzed to determine groupings of components within the screen image, where the determined component groupings may be referenced to determine additional details. For example, the determination of a certain component grouping may indicate to the liquid application portal that another related component is also included in the screen image. By determining the related component based on the determined component grouping, the liquid application portal may determine a remaining component from the screen image that has not yet been identified with a greater certainty. As an example, the grouping information may be extracted from the pretype itself. The logic for analyzing the component groupings to infer the associated details may be retrieved from a domain knowledge database 1230, where the domain knowledge database 1230 may be included in the RAD database 130.

The business analysis circuitry 114 may further modify any one or more tags that have been determined (1203). The business analysis circuitry 114 may initiate an automatic process for modifying existing tags based on the received business analysis information 1210 or other information determined within the process (311), or the business analysis circuitry 114 may allow a GUI that allows the user to modify existing tags.

The extracted metadata from the processes implemented by (311) may be stored as artifacts information 1240.

Figure 13:
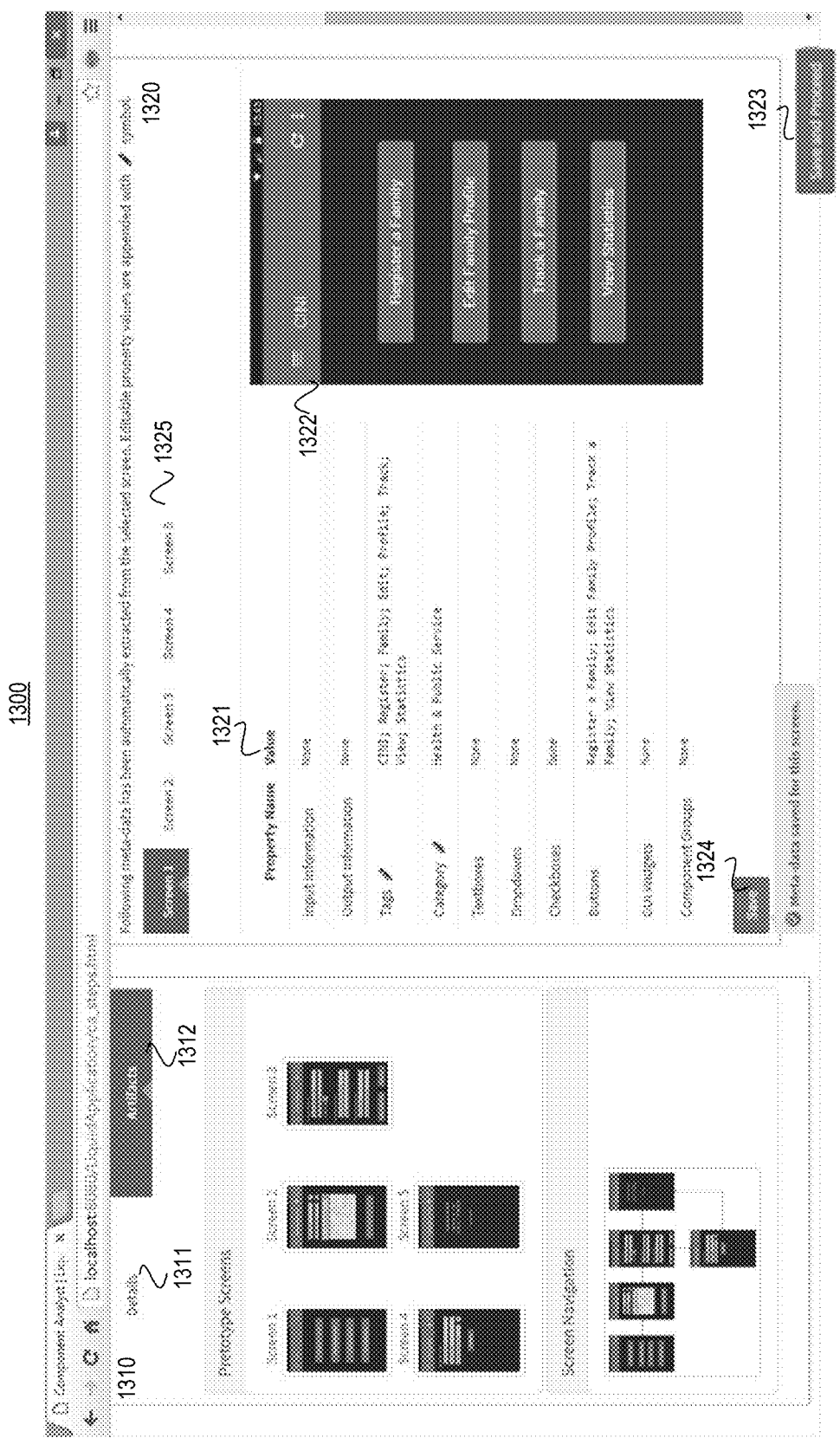
FIG. 13 shows an exemplary application composition graphical user interface of the rapid application developer system.

An exemplary sixth GUI 1300 is shown in FIG. 13, where the sixth GUI 1300 corresponds to an operation of the component analysis circuitry 116 within the liquid application portal for implementing at least some of the processes included at (311). The sixth GUI 1300 includes a navigation menu that includes an analyze screens tab, a suggesting candidates tab, and an application overview tab, where the sixth GUI 1300 is operating under the analyze screens tab for analyzing screen images for pretypes obtained from the business analysis information 1210 corresponding to the process at (311).

The sixth GUI 1300 may include a particulars section 1310 and an actions section 1320. The actions section 1320 includes a screen image selection option 1325 that enables selection of screen images belonging to the pretype being analyzed, and a screen image display region 1322 that displays the screen image corresponding to the screen image selected from the screen image selection option 1325. The actions section 1320 also includes a corresponding table 1321 that identifies metadata extracted from the screen image displayed in the screen image display region 1322, as well as corresponding values for the extracted metadata. The table 1321 includes a tags and category field, where the tags and category information may be edited by the user. Any modifications to the tags and category information in the table 1321 may be saved into the corresponding metadata by selecting the save option 1324.

The particulars section 1310 includes a details option 1311 (not selected in sixth GUI 1300) that describes information corresponding to, for example, the business analysis information 1210. The particulars section further includes an artifacts option 1312, illustrated in sixth GUI 1300 as being selected, that displays screen images and screen navigation information corresponding to the pretype being analyzed.

The sixth GUI 1300 further includes a save and proceed option 1323. By selecting the save and proceed option 1323, the current status and information gathered for the target application may be saved by the liquid application portal. The user may later retrieve the saved target application to begin at the status and with the information saved at the time of selection of the latest save and proceed option 1323 by logging into the liquid application portal.

Figure 14:
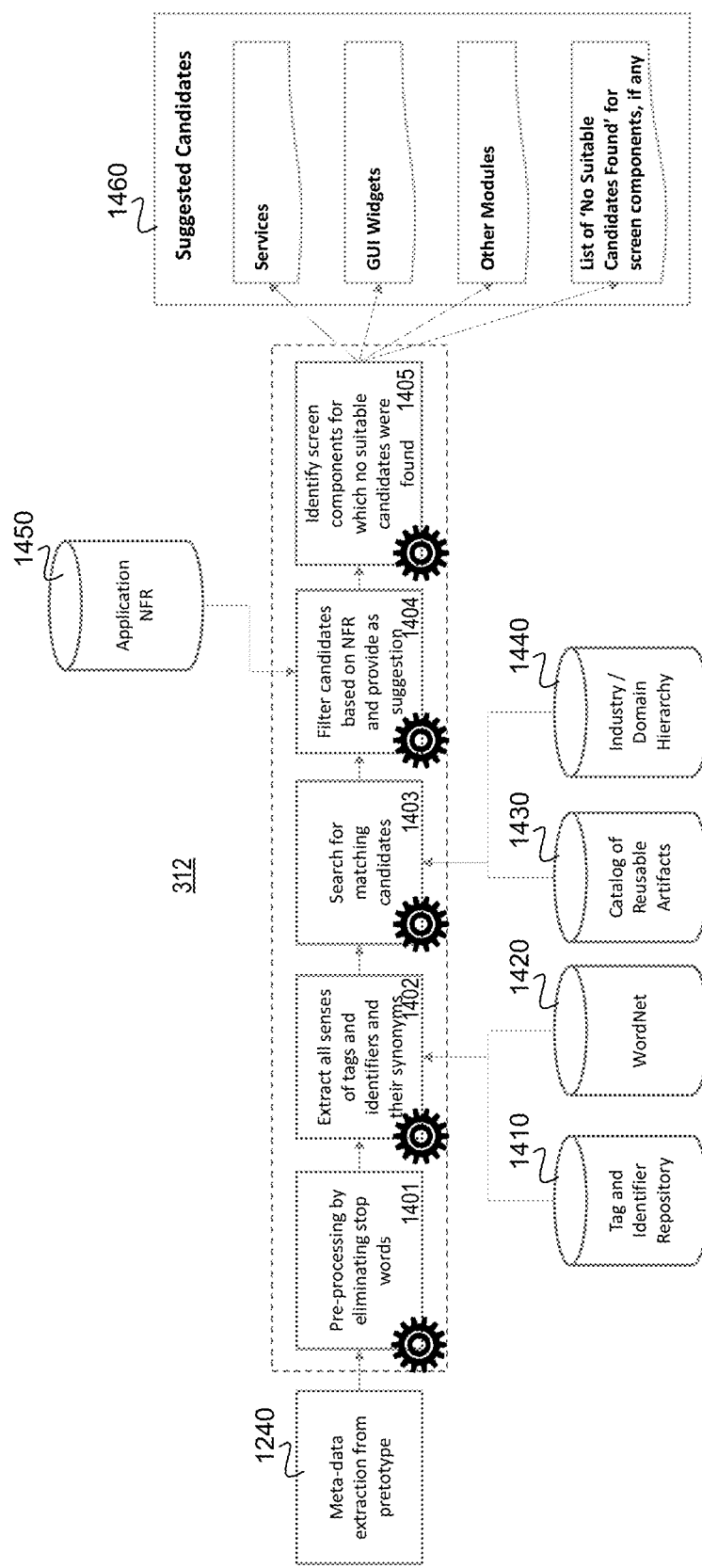
FIG. 14 shows a flow chart of logic describing processes that the rapid application developer system may implement.

FIG. 14 shows a flow chart of logic that may be included to implement process (312) attributed to the component analysis circuitry 116 for presenting candidate component suggestions for the target application. The artifacts information 1240, including the metadata previously extracted from the pretypes, is received by the component analysis circuitry 116 as an input to the process at (312).

The component analysis circuitry 116 may implement pre-processing by eliminating stop words from the extracted metadata (1401). The pre-preprocessing may be automatically implemented based on the received artifacts information 1240.

The component analysis circuitry 116 may further extract all tags, identifiers, and their synonyms that are detected from the extracted metadata (1402). The extraction of the tags, identifiers, and their synonyms may be aided by first eliminating stop words from the metadata. For example, when a text field includes "Enter Date of Birth, the component analysis circuitry 116 may eliminate the stop word "Enter" from the text field so that only "Date of Birth" remains. Then the "Date of Birth" tag may be used for subsequent processing.

The extraction of the tags, identifiers, and their synonyms may be implemented automatically based on the information received from the pre-processing. The identification of the extracted tags, identifiers, and their synonyms may be aided by information retrieved from a tag and identifier repository 1410, where the tag and identifier repository 1410 may be included in the RAD database 130. The extraction of the tags, identifiers, and their synonyms may further be based on information retrieved from a WordNet database 1420, where the WordNet database 1420 may be included in the RAD database 130. After the extraction of the tags, identifiers, and their synonyms, the component analysis circuitry may be left with a list of tags, identifiers, and their synonyms that have been identified from the metadata.

The component analysis circuitry 116 may further search for candidate components that match up with the list of extracted tags, identifiers, and their synonyms (1403). The candidate components are application components that may be included in the target application. The search for matching candidate components may be automatically implemented by the component analysis circuitry 116 based on the information extracted at (1402). The search for matching candidate components may be based on a matching criteria such as a confidence level determination. For every candidate component, a set of tags and identifiers may be stored. Once the corresponding metadata is extracted, matching candidate components may be suggested based on their generated confidence level, where the confidence level may be generated according to the term frequency-inverse document frequency (TF-IDF) numerical statistic concept. Then with every identifier, a weight may be associated depending on its ability to identify a candidate. The weight may be calculated as, for example: weight=1/(frequency of identifier in database). Every shortlisted candidate component may be assigned a weight depending on which identifier found it. For example, if N identifiers find a candidate component, their weights are added together and then a combined weight may be used as the confidence level to suggest that candidate component in subsequent processing.

The search for matching candidate components may be based, at least in part, on a specific industry (e.g., the search for matching candidate components may identify candidate components that are commonly included in applications from the selected industry corresponding to the target application), where the information for determining which components are included in a specific industry may be retrieved from an industry/domain hierarchy database 1440. The industry/domain hierarchy database 1440 may be included as part of the RAD database 130. The search for matching candidate components may also be based on a catalog of reusable artifacts 1430 (e.g., UI elements, services, widget (e.g. map widget) or components) that may be known to be used for the selected industry corresponding to the target application. The catalog of reusable artifacts 1430 may be included as part of the RAD database 130.

At (1403), the component analysis circuitry 116 may further filter candidate components that have been matched at (1403) based on NFR and provide the filtered candidate components as suggestion candidate components. The NFR may be retrieved from an application NFR database 1450, where the application NFR database 1450 may be included as part of the RAD database 130. For example, the filtering process may filter out from consideration those candidate components that do not satisfy the NFR input by the user according to the process for recording additional details at (303) as a function of the business analysis circuitry 114. The NFR information stored in the application NFR database 1450 may include the NFR information input by the user earlier by the process for recording additional details at (303) as a function of the business analysis circuitry 114.

The candidate components that remain after the filtering process may be presented to the user as suggested candidate components information 1460.

The component analysis circuitry 116 may further identify screen components for which no suitable candidate component were determined (1405). A list of components that were identified from the artifacts information 1240 but were not matched with a candidate component from the processes included at (312) may also be included in the suggested candidate components information 1460.

Figure 15:
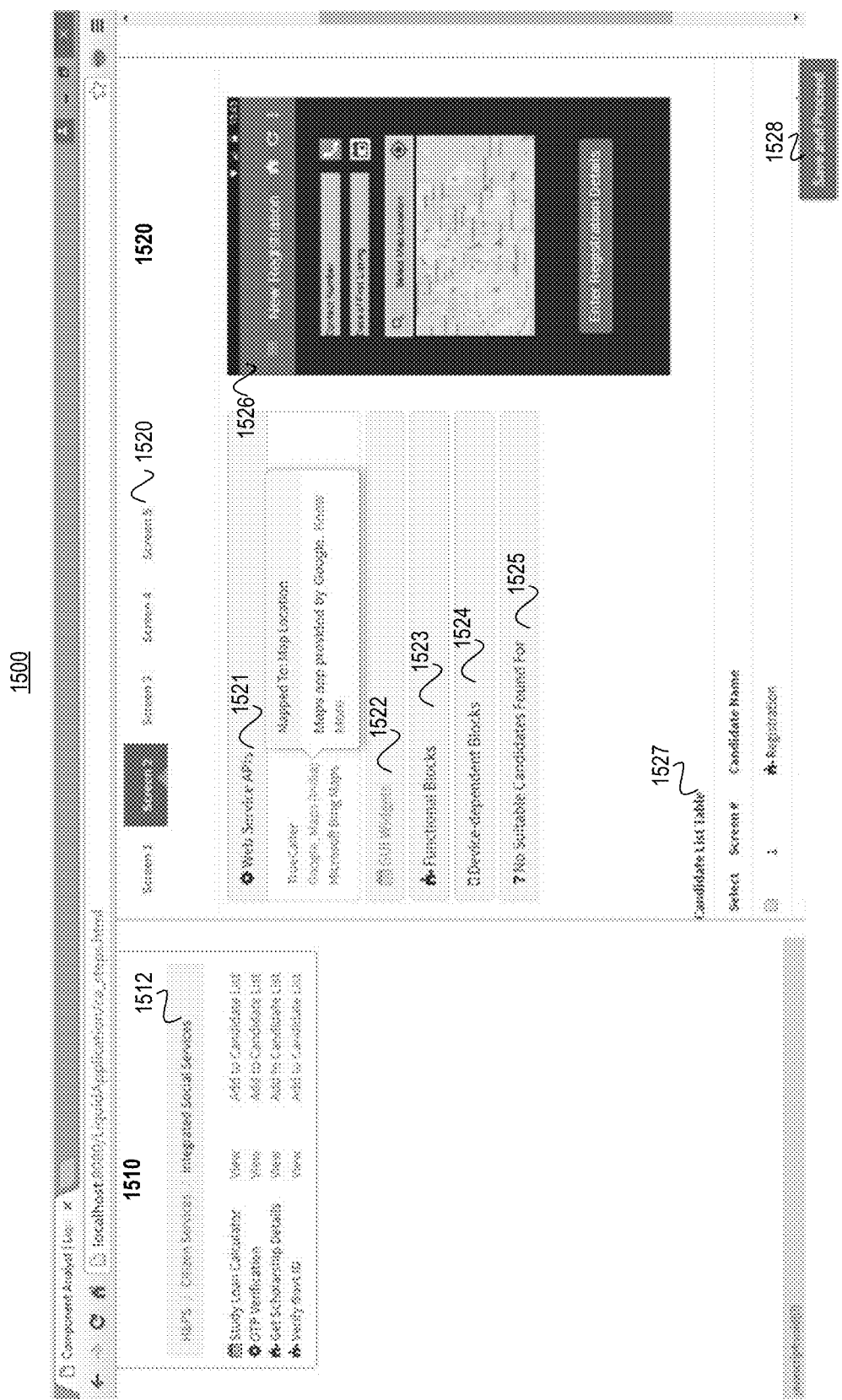
FIG. 15 shows an exemplary application composition graphical user interface of the rapid application developer system.

FIG. 15 shows an exemplary seventh GUI 1500 of the liquid application portal, where the seventh GUI 1500 corresponds to an operation of the component analysis circuitry 116 within the liquid application portal for implementing at least some of the processes included at (312). The seventh GUI 1500 includes a navigation menu that includes an analyze screens tab, a suggesting candidates tab, and an application overview tab, where the seventh GUI 1500 is operating under the suggesting candidates tab for suggesting candidate components to include in the target application corresponding to the process at (312).

The seventh GUI 1500 also includes a particulars section 1510 and an actions section 1520. The actions section 1520 includes a screen image selection option 1520 that allows the user to select a screen image from the pretotype being analyzed. The actions section 1520 further includes a screen image display region 1524 that displays the screen image selected from the screen image selection option 1520. The selected screen image may include artifacts included in the received artifacts information (e.g., artifacts information 1240). The actions section 1520 also includes a corresponding set of suggested candidate components for adding to a screen of the target application. The set of suggested candidate components may include a list of web service APIs 1521, a list of GUI widgets 1522, a list of functional blocks 1523, a list of device-dependent blocks 1524, where each of the suggested candidate components may be viewed and/or added to a candidate component list. The actions section 1520 also includes a list of missing components 1525 identified from the artifacts information 1240 where a matching candidate component could not be determined. By selecting the Google_Maps (India) API listed under the web service APIs 1521, a pop-up display is shown that describes the Google_Maps (India) API has been successfully mapped to the target application in the seventh GUI 1500. The actions section 1520 also includes a candidate list table 1527 that identifies one or more candidate components that have been suggested for each respective screen image.

The particulars section 1510 includes a catalog option 1512 that identifies and describes information included in a catalog of reusable artifacts. For example, for the specified integrated social services industry, the catalog option 1512 identifies a student load calculator, an OTP verification, a get scholarship details, and a verify government ID as available artifacts for reuse in developing the target application.

The seventh GUI 1500 further includes a save and proceed option 1528. By selecting the save and proceed option 1528, the current status and information gathered for the target application may be saved by the liquid application portal. The user may later retrieve the saved target application to begin at the status and with the information saved at the time of selection of the latest save and proceed option 1528 by logging into the liquid application portal.

Figure 16:
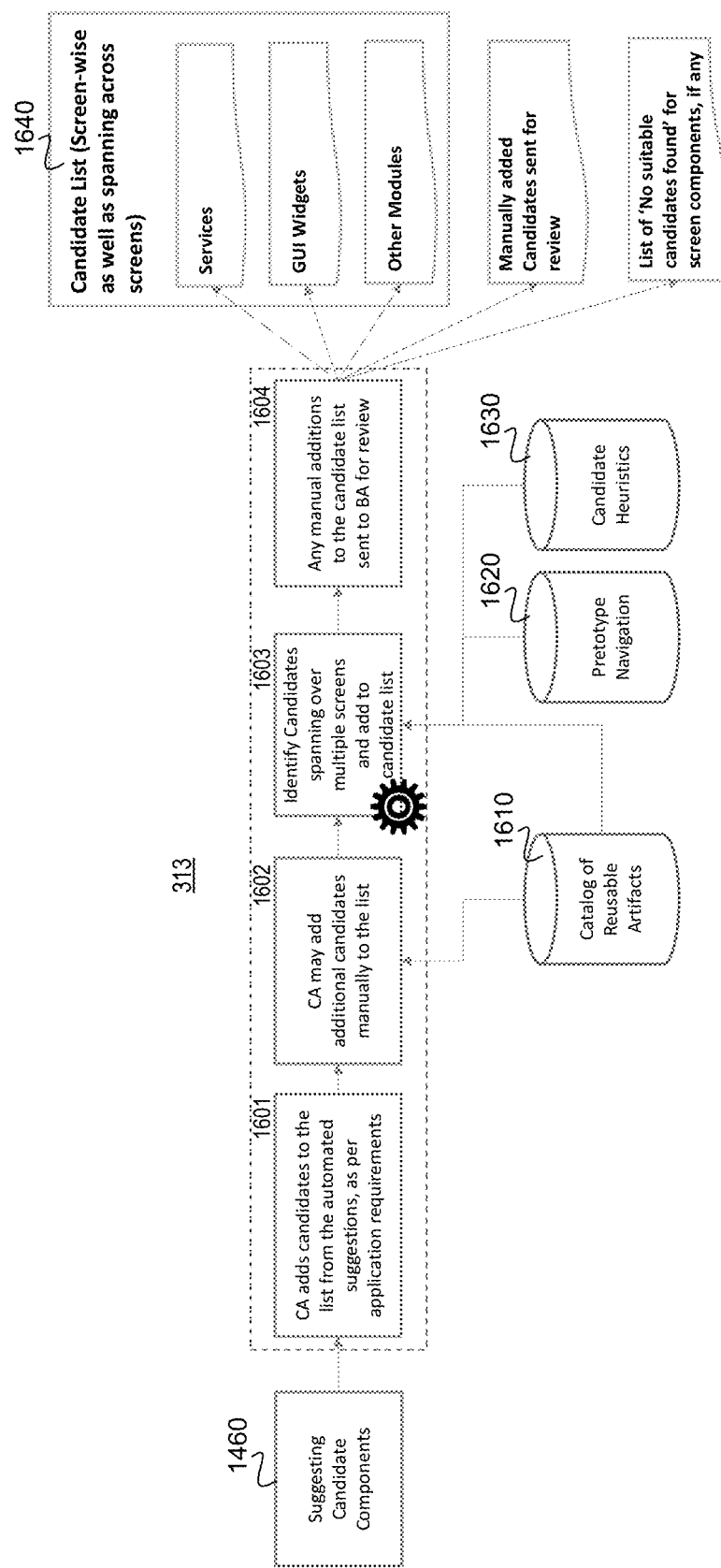
FIG. 16 shows a flow chart of logic describing processes that the rapid application developer system may implement.

FIG. 16 shows a flow chart of logic that may be included to implement process (313) attributed to the component analysis circuitry 116 for adding candidate components to a candidate component list. The suggested candidate components information 1460 is received by the component analysis circuitry 116 as an input to the process at (313).

The component analysis circuitry 116 may add candidate components to the candidate component list based on the suggested candidate components included in the suggested candidate components information 1460 and the target application requirements input earlier for the target application (1601). For example, the component analysis circuitry 116 may automatically select suggested candidate components from the suggested candidate components information 1460 that satisfy the earlier input target application requirements that were input at (303).

The component analysis circuitry 116 may further allow the user to manually select suggested candidate components and include them into the candidate component list (1602). For example, the component analysis circuitry 116 may allow the user to select candidate components from the suggested candidate components that are presented through the liquid application portal to be included in the candidate component list. The additional candidate components that are manually added to the candidate component list may be retrieved from a catalog of reusable artifacts 1610, where the catalog of reusable artifacts 1610 may be included as part of the RAD database 130.

The component analysis circuitry 116 may further identify candidate components that span over multiple application screens and add such candidate components to the candidate component list (1603). The candidate components that span over multiple application screens may be identified from information received from one or more of the catalog of reusable artifacts 1610, a pretotype navigation database 1620, and a candidate heuristics database 1630. The pretotype navigation database 1620 and the candidate heuristics database 1630 may be included as part of the RAD database 130. The catalog of reusable artifacts 1610 may include reusable candidate components. The pretotype navigation database 1620 may include navigational flow information extracted from pretotypes. The candidate heuristics database 1630 may include certain heuristics where their corresponding candidates that have their own typical ways in which they occur across applications. For example when a registration functionality is being considered, the registration functionality may be a reusable artifact stored in the catalog of reusable artifacts 1610. When candidates are suggested for each of the pretotype screen images, the registration module may appear as a suggestion for these screens, usually identified by the phrases "Register", "New Registration", "Complete Registration", "Enter details for Registration", "Registration complete", or "Registration Successful", or another phrase related to registration. The navigational flow information corresponding to the registration functionality pretotype may be stored in the pretotype navigation database 1620, which helps identify the set of consecutive screens that correspond to the registration functionality. The candidate heuristics database 1630 may store certain functionality-specific information, which helps confirm whether the candidate under consideration fulfills these specifications. The registration module may start with a "Register" or "New Registration" identifier, followed by accepting some inputs required for registration, and finally ending with "Registration Complete" or "Registration Successful" identifier. These heuristics may assist in confirming whether the registration functionality is valid for those set of screens.

The component analysis circuitry 116 may further present the user with a list of any additional candidate components that are being manually added, or requested to be added, to the candidate component list (1604). From the processes described as being included at (313), the candidate component list 1640 may be generated.

Figure 17:
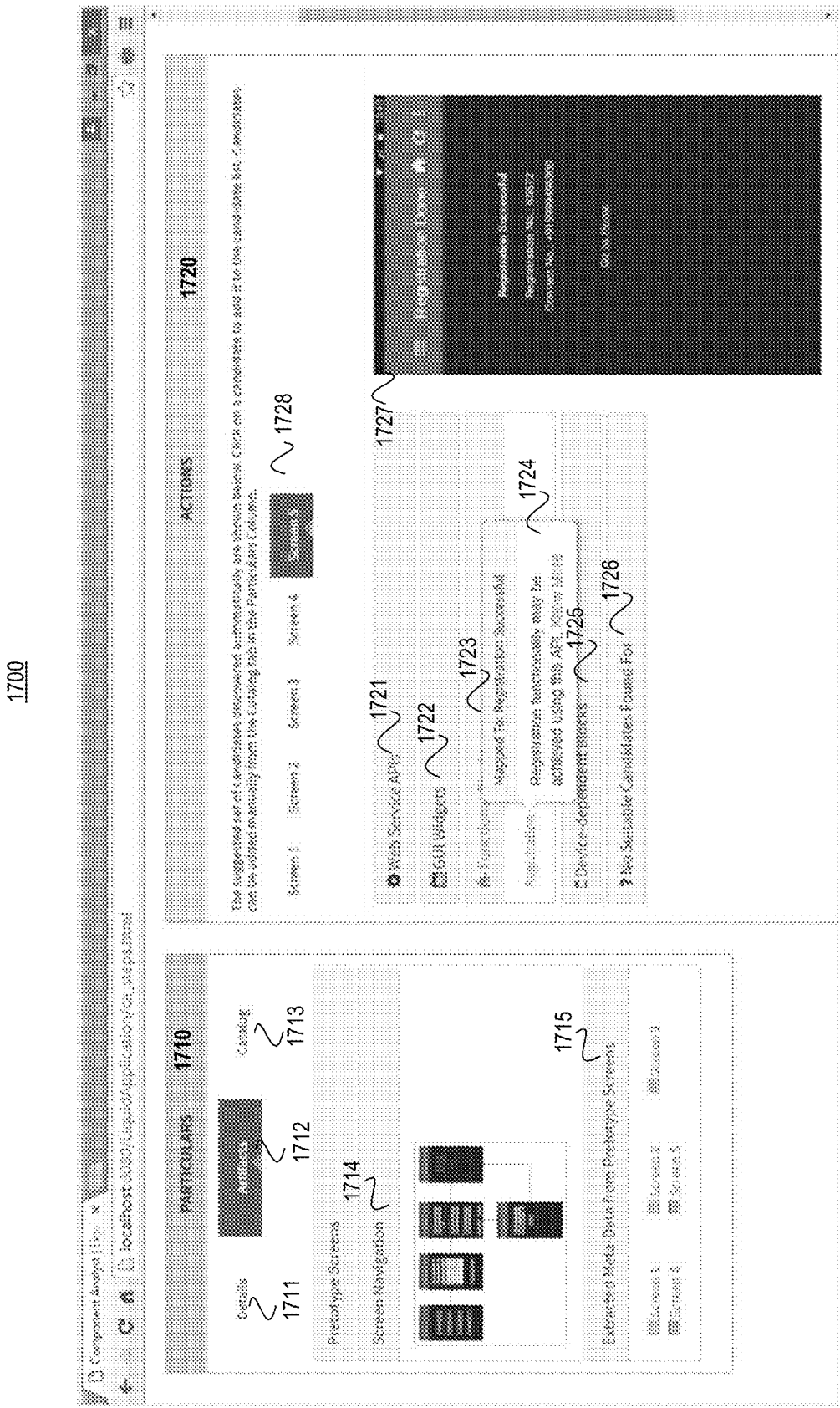
FIG. 17 shows an exemplary application composition graphical user interface of the rapid application developer system.

FIG. 17 shows an exemplary eighth GUI 1700 of the liquid application portal, where the eighth GUI 1700 corresponds to an operation of the component analysis circuitry 116 within the liquid application portal for implementing at least some of the processes included at (313). The eighth GUI 1700 includes a navigation menu that includes an analyze screens tab, a suggesting candidates tab, and an application overview tab, where the eighth GUI 1700 is operating under the suggesting candidates tab 1701 for adding candidate components to a candidate component list corresponding to the process at (313).

The eighth GUI 1700 also includes a particulars section 1710 and an actions section 1720. The actions section 1720 is similar to the actions section 1520 shown as being included in the seventh GUI 1500. For example, eighth GUI 1700 also includes a screen image selection option 1728, and a screen image display region 1727 that displays the screen image selected from the screen image selection option 1728, where the screen image may include artifacts included in the received artifacts information (e.g., artifacts information 1240). The actions section 1720 included in the eighth GUI 1700 is illustrated to have screen image 5 selected from the screen image selection option 1728. The eighth GUI 1700 is further illustrated to have a representation of the screen image 5 depicted in the screen image display region 1727.

The eighth GUI 1700 further includes a corresponding set of suggested candidate components for adding to a screen of the target application. The set of suggested candidate components may include a list of web service APIs 1721, a list of GUI widgets 1722, a list of functional blocks 1723, and a list of device-dependent blocks 1725, where each of the suggested candidate components may be viewed and/or added to a candidate component list. By selecting the registration block listed under the list of functional blocks 1723, a pop-up display is shown that describes the registration block has been successfully mapped to the target application in the eighth GUI 1700. The actions section 1720 also includes a list of missing components 1726 identified from the artifacts information 1240 where a matching candidate component could not be determined.

The particulars section 1710 includes a details option 1711, an artifacts option 1712 that describes information corresponding to the candidate components added to the candidate component list, and a catalog of reusable components option 1713. The eighth GUI 1700 is shown to have the artifacts option 1722 selected such that the particulars section 1712 displays screen navigational information 1714 and metadata information 1715 according to their respective screen images that may be selected from the screen image selection option 1728.

The eighth GUI 1700 further includes a save and proceed option 1726. By selecting the save and proceed option 1726, the current status and information gathered for the target application may be saved by the liquid application portal. The user may later be retrieved by the user upon log-in to begin at the status and with the information saved at the time of selection of the latest save and proceed option 1726.

Figure 18:
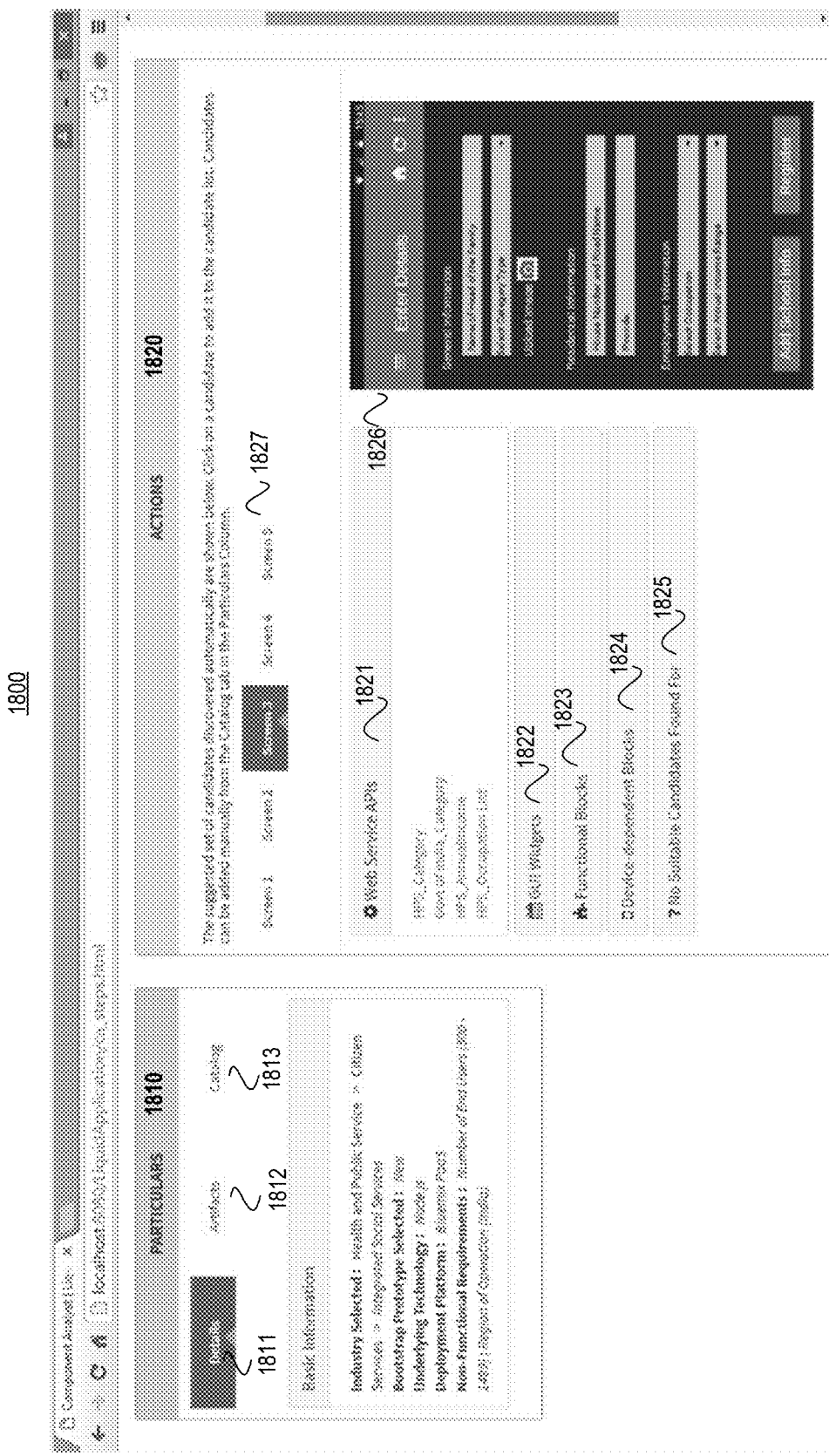
FIG. 18 shows an exemplary application composition graphical user interface of the rapid application developer system.

FIG. 18 shows an exemplary ninth GUI 1800 of the liquid application portal, where the ninth GUI 1800 corresponds to an operation of the component analysis circuitry 116 within the liquid application portal for implementing at least some of the processes included at (312). The ninth GUI 1800 includes a navigation menu that includes an analyze screens tab, a suggesting candidates tab, and an application overview tab, where the ninth GUI 1800 is operating under the suggesting candidates tab for suggesting candidate components to include in the target application corresponding to the process at (312).

The ninth GUI 1800 also includes a particulars section 1810 and an actions section 1820. The actions section 1820 includes a screen image selection option 1827, and a screen image display region 1826 that displays the screen image selected from the screen image selection option 1827, where the screen image may include artifacts included in the received artifacts information (e.g., artifacts information 1240). The screen image 3 selected by the screen image selection option 1827 and depicted in the screen image display region 1826 is a different application screen from the screen image 2 included in screen image display region 1526 shown in seventh GUI 1500. It follows that the suggested candidate components included in the actions section 1820 are also different from the suggested candidate components included in the actions section 1520.

The ninth GUI 1800 further includes a corresponding set of suggested candidate components for adding to a screen of the target application. The set of suggested candidate components may include a list of web service APIs 1821, a list of GUI widgets 1822, a list of functional blocks 1823, and a list of device-dependent blocks 1824, where each of the suggested candidate components may be viewed and/or added to a candidate component list. The web service APIs 1821 displays a list of web service APIs that are found to be included in the application selected by the screen image selection option 1827 (HPS_category, Government of India_category, HPS_annualincome, HPS_occupation list). Further, the actions section 1820 also includes a list of missing components 1825 identified from the artifacts information 1240 where a matching candidate component could not be determined.

The particulars section 1810 includes a details option 1811, an artifacts section 1812, and a catalog of reusable candidates. The details option 1811 describes information corresponding to the information obtained by the liquid application portal for developing the target application up to this point.

Figure 19:
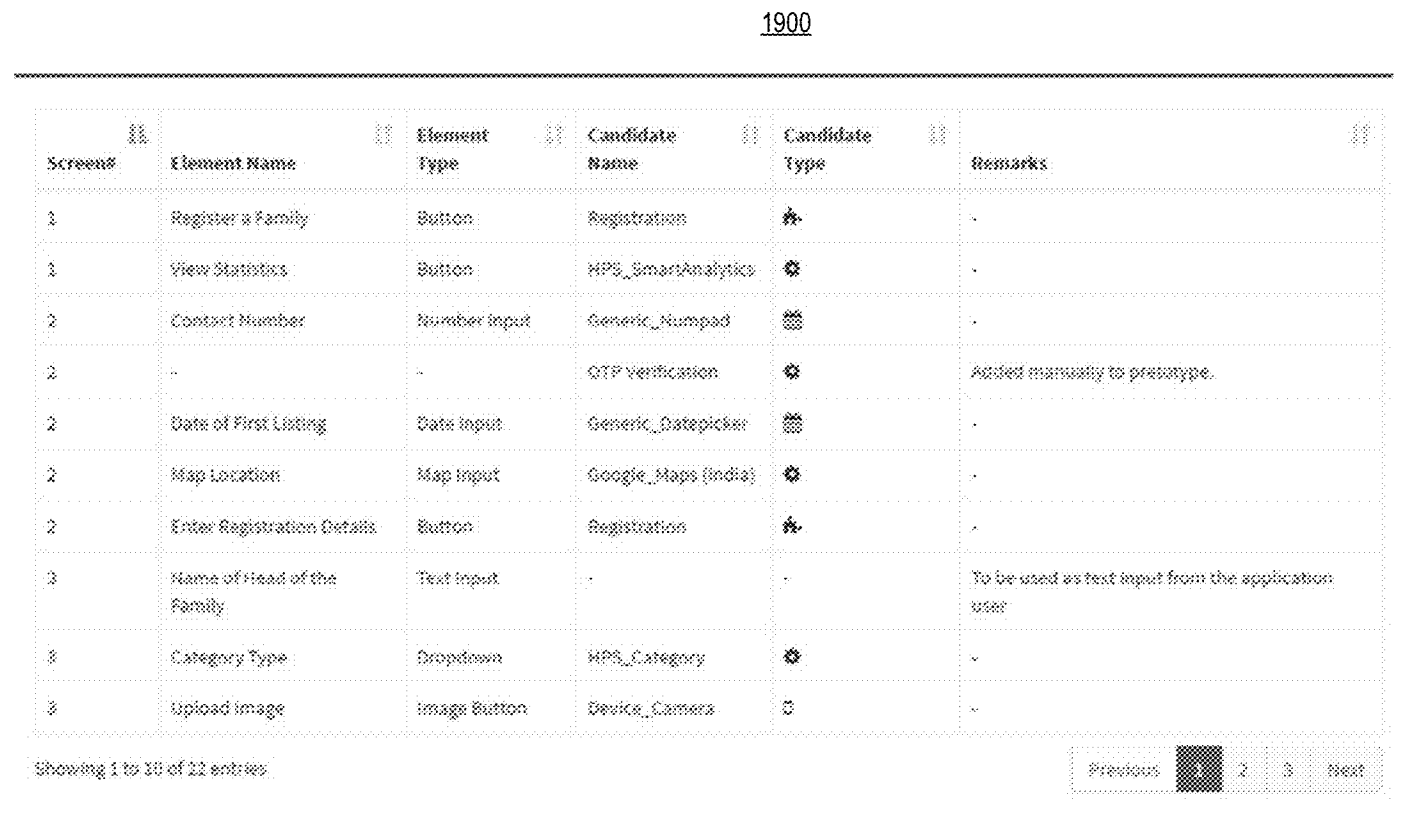

FIG. 19 shows an exemplary table 1900 that includes all the candidate components that have been added via the liquid application portal (e.g., candidate components added via the seventh GUI 1500, eighth GUI 1700, or ninth GUI 1800). The table 1900 is sorted by screen images, and provides an element name, an element type, a candidate name, a candidate type, and remarks for each candidate component that has been added for each screen image corresponding to the pretypes being analyzed by the liquid application portal. It follows that table 1900 may be referenced as a candidate component list by the liquid application portal.

Figure 20:
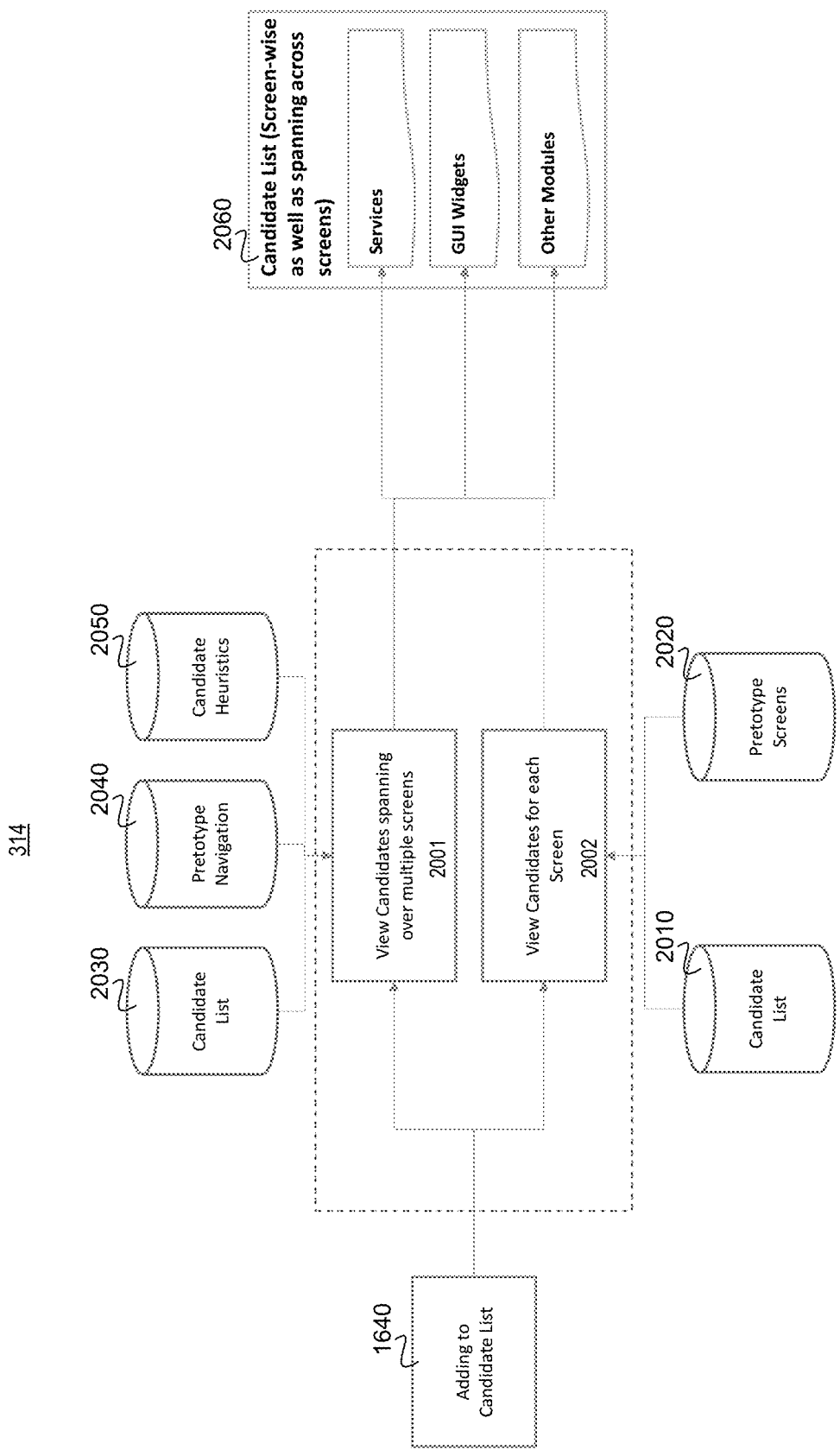
FIG. 20 shows a flow chart of logic describing processes that the rapid application developer system may implement.

FIG. 20 shows a flow chart of logic that may be included to implement process (314) attributed to the component analysis circuitry 116 for presenting candidate components for the target application. The candidate component list 1640 is received by the component analysis circuitry 116 as an input to the process at (314).

Candidate components from the candidate component list that are identified as spanning over multiple application screens may be presented to the user (2001). The component analysis circuitry 116 may identify and present the candidate components that span over multiple application screens based on, for example, the candidate component list stored on and received from a candidate list database 2030, pretype navigation information (describing how candidate components may be navigated across one or more application pages) stored on and received from a pretype navigation database 2040, and candidate heuristics information stored on and received from a candidate heuristics database 2050. One or more of the candidate list database 2030, the pretype navigation database 2040, and the candidate heuristics database 2050 may be included as part of the RAD database 130.

Candidate components from the candidate component list may also be presented to the user according to the application screen from which the candidate component was extracted from, where the application screens are included in the uploaded pretypes (2002). The component analysis circuitry 116 may identify and present the candidate components according to their respective application screen based on, for example, the candidate component list stored on and received from a candidate list database 2010, and pretype screen information stored on and received from a pretype screens database 2020. One or more of the candidate list database 2010, and the pretype screens database 2020 may be included as part of the RAD database 130. The candidate heuristics database 1630 may store functionality-specific information for a functional component. For example, for a registration functionality, a starting screen may be identified as including the identifier "New Registration" or "Register". The end of the registration functionality may be identified as ending with the identifier "Registration Complete" or "Registration Successful" with a possible text/label which would navigate to the Home page. The intermediate screens of the registration functionality may ask for certain information identified, for example, with the text identifier "enter details to complete registration".

The presentation of the candidate component list 2060 after identifying the candidate components that are identified as spanning over multiple application screens (2001) and identifying candidate components according to their respective application screens (2002), may include any combination of services candidate components, GUI widget candidate components, and other candidate component modules. The presentation of the candidate component list 2060 may be made, for example, on an application composition graphical user interface such as the liquid application portal described herein. In particular, the candidate components may be presented on a palette menu section of the liquid application portal.

Figure 21:
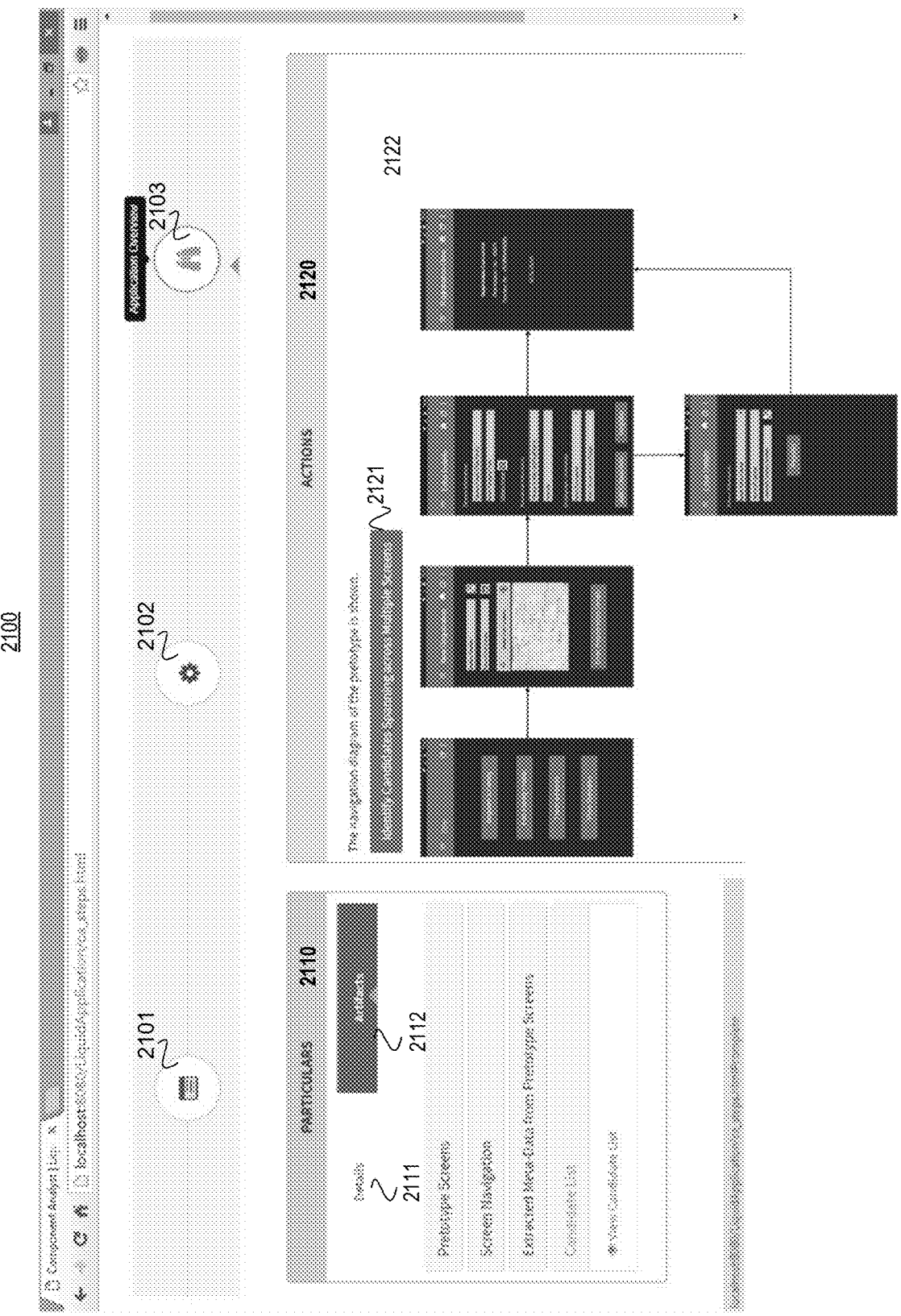
FIG. 21 shows an exemplary application composition graphical user interface of the rapid application developer system.

An exemplary tenth GUI 2100 is shown in FIG. 21, where the tenth GUI 2100 corresponds to an operation of the component analysis circuitry 116 within the liquid application portal for implementing at least some of the processes included at (314). The tenth GUI 2100 includes a navigation menu that includes an analyze screens tab 2101, a suggesting candidates tab 2102, and an application overview tab 2103. The tenth GUI 2100 is illustrated as having the application overview tab 2103 highlighted to indicate a process for viewing candidate components for the target application corresponding to the process at (314).

The tenth GUI 2100 also includes a particulars section 2110 and an actions section 2120. The actions section 2120 includes a navigation map 2122 that presents a navigational map of candidate components identified as spanning across multiple application screens. The navigation map 2122 also includes navigational direction cues (e.g., arrows) that identify a navigational flow order for traversing application pages included in the navigation map 211. The navigation map 2122 also includes grouping cues (e.g., dashed line groupings) for indicating application screens that are grouped to a common candidate component.

The actions section 2120 further includes an identify candidates option 2121, where selection of the identify candidates option 2121 causes the component analysis circuitry 116 to automatically identify candidates that span across multiple application screens (e.g., identify the candidate components from the navigation map 2122).

The particulars section 2110 includes a details option 2111, and an artifacts option 2112. The artifacts option 2112 is illustrated as being selected in the tenth GUI 2100, where the artifacts option 2112 describes information corresponding to candidate components included in the current candidate component list. The artifacts option 2111 may be organized according to application screens that are included for a particular pretotype. The artifacts option 2112 may further describe screen navigation information, extracted metadata, and present the current candidate component list. Each of the application screens included for the particular pretotype may include their own list of candidate components determined to be included in the application screen.

Figure 22:
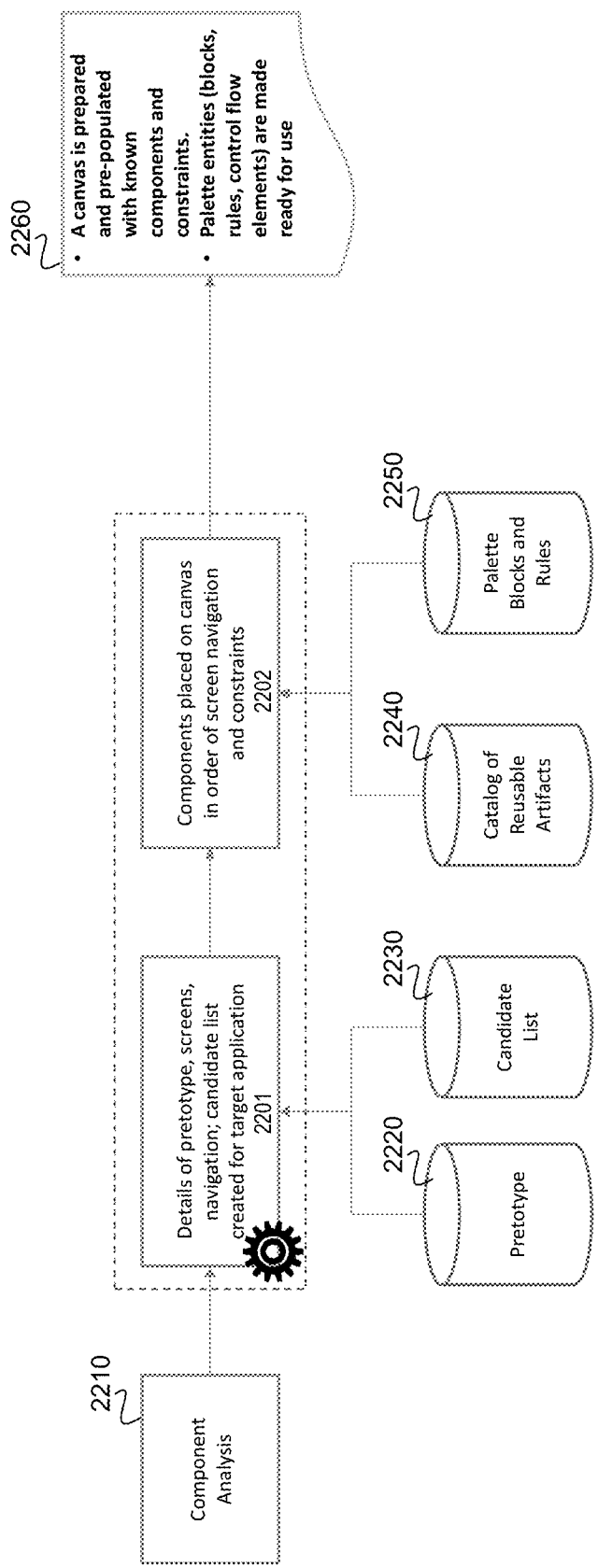
FIG. 22 shows a flow chart of logic describing processes that the rapid application developer system may implement.

FIG. 22 shows a flow chart of logic that may be included to implement process (321) attributed to the application design circuitry 118 for arranging candidate components for designing a target application. The candidate component analysis information gathered from the component analysis circuitry 116 (e.g., candidate component list) is received by the application design circuitry 118 as an input to the process at (321).

Based on the received candidate component analysis information, the application design circuitry 118 may further gather information from pretotypes (e.g., the uploaded pretotype) including application screen information and application screen navigation information obtained from the pretotypes, to update the candidate component list (2201). The application design circuitry 118 may receive pretotype information from a pretotype database 2220, and candidate component information from a candidate component list database 2230. The pretotype database 2220 and the candidate component list database 2230 may be included as part of the RAD database 130.

Candidate components may then be placed onto an application canvas within the application composition graphical user interface (e.g., liquid application portal) to display the application screen navigation and constraints of the candidate components that are placed in the application canvas (2202). The candidate components that are placed onto the application canvas may be retrieved from a catalog of reusable artifacts database 2240 and a palette blocks and rules database 2250. The reusable artifacts database 2240 and the palette blocks and rules database 2250 may be included as part of the RAD database 130.

From the processes described as being included at (321), an application canvas 2260 for developing the target application may be presented.

Figure 23:
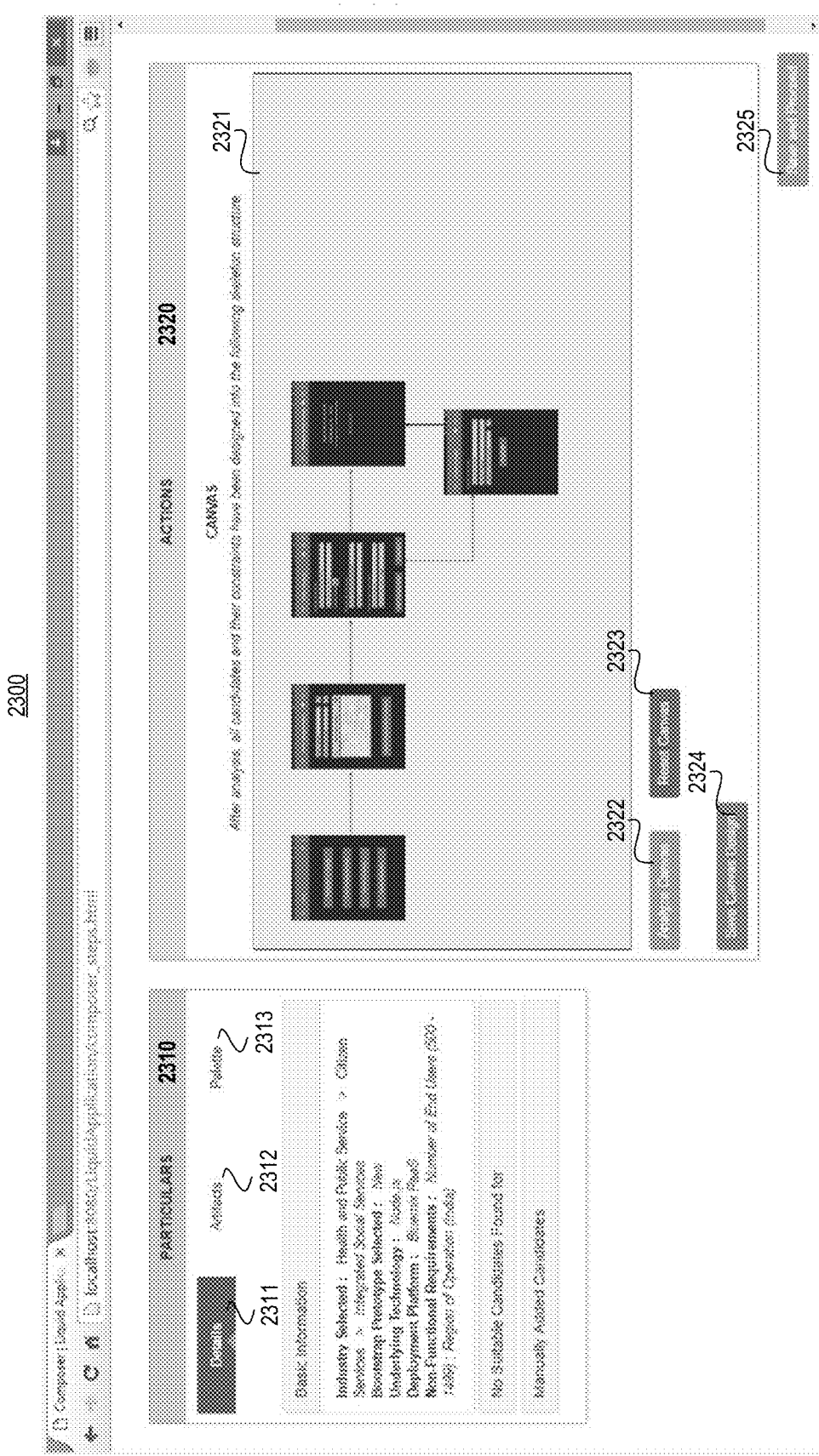
FIG. 23 shows an exemplary application composition graphical user interface of the rapid application developer system.

An exemplary eleventh GUI 2300 is shown in FIG. 23, where the eleventh GUI 2300 corresponds to an operation of the application design circuitry 118 within the liquid application portal for implementing at least some of the processes included at (321). The eleventh GUI 2300 operates to design the target application by arranging candidate components in an application canvas corresponding to the process at (321).

The eleventh GUI 2300 includes a particulars section 2310 and an actions section 2320. The actions section 2320 includes an application canvas 2321 that presents application screen images including the candidate components selected from the candidate component list for developing the target application. The application canvas 2321 also includes navigational flow indicators (e.g., dashed arrows, solid arrows) for indicating navigational flow rules between the application screen images and candidate components in the application canvas 2321.

The actions section 2320 further includes an analyze canvas option 2322, a reset canvas option 2323, and a save canvas design option 2324. The actions section 2320 further includes a save and proceed option 2325. By selecting the save and proceed option 2325, the current status and information gathered for the target application may be saved by the liquid application portal. The user may later retrieve the saved target application to begin at the status and with the information saved at the time of selection of the latest save and proceed option 2325 by logging into the liquid application portal.

The particulars section 2310 includes a details option 2311, an artifacts option 2312, and a palette option 2313. The details options 2311 is illustrated in the eleventh GUI 2300 as being selected, and presents information describing the target application. This includes industry selection information, uploaded/selected/created pretotype(s) information, underlying technology information, deployment information, NFR information, information identifying candidate components from application screens that could not be identified, and new candidate components that have been manually added to the current candidate component list.

Figure 24:
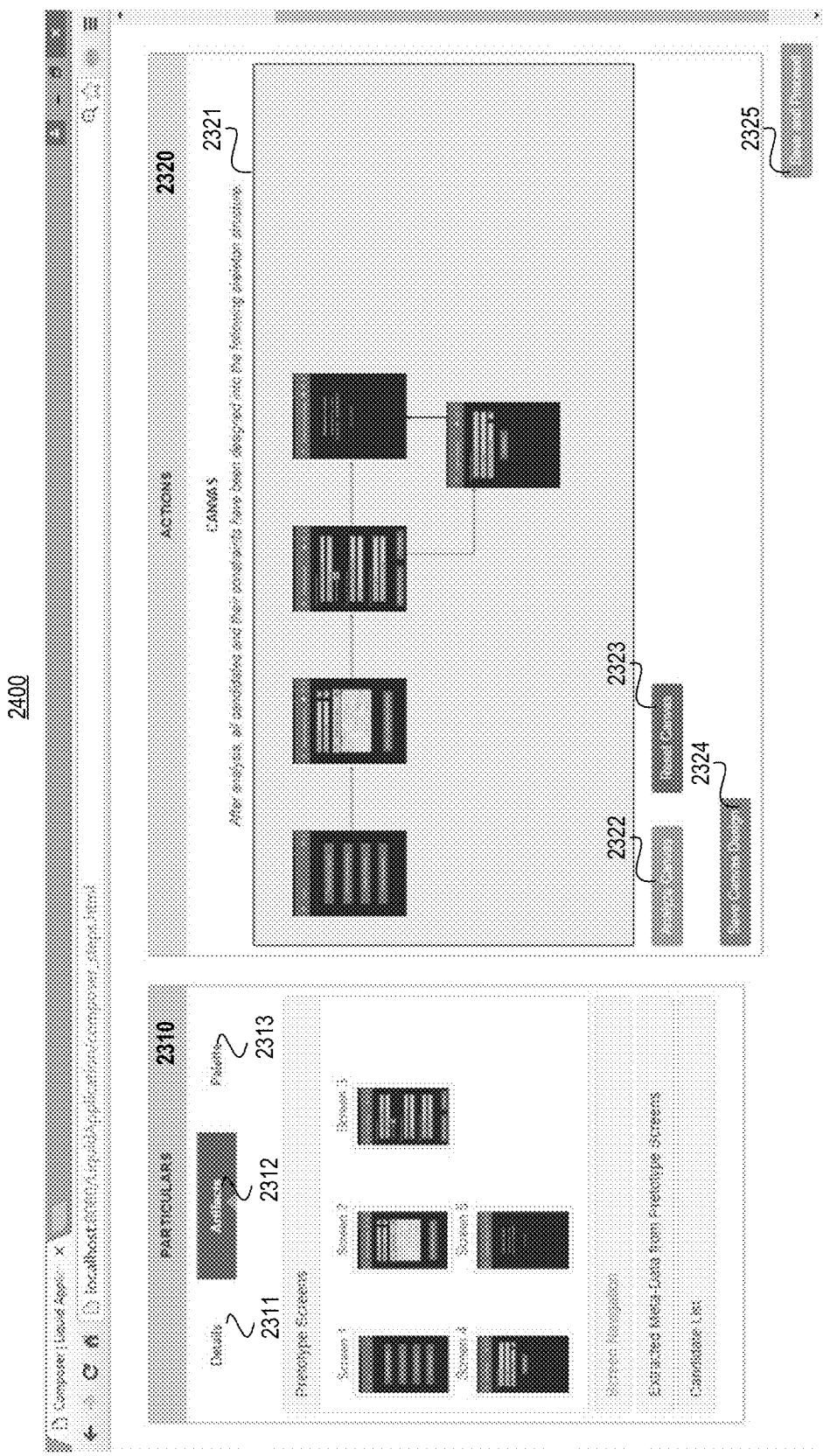
FIG. 24 shows an exemplary application composition graphical user interface of the rapid application developer system.

An exemplary twelfth GUI 2400 is shown in FIG. 24, where the twelfth GUI 2400 corresponds to an operation of the application design circuitry 118 within the liquid application portal for implementing at least some of the processes included at (321). The twelfth GUI 2400 is similar to the eleventh GUI 2300 other than the particulars section 2310 in the twelfth GUI 2400 displaying an artifacts option 2312 instead of a details option 2311, based on a selection of the artifacts option 2312.

The artifacts option 2412 may be organized according to application screens that are included for a particular pretotype. Each of the application screens included for the particular pretotype may include their own list of candidate components determined to be included in the application screen. When an application screen is selected (e.g., selected for expanded view) from the artifacts option 2412, the candidate components determined to be included in the selected application screen will be presented along with information obtained for the respective candidate components.

Figure 25:
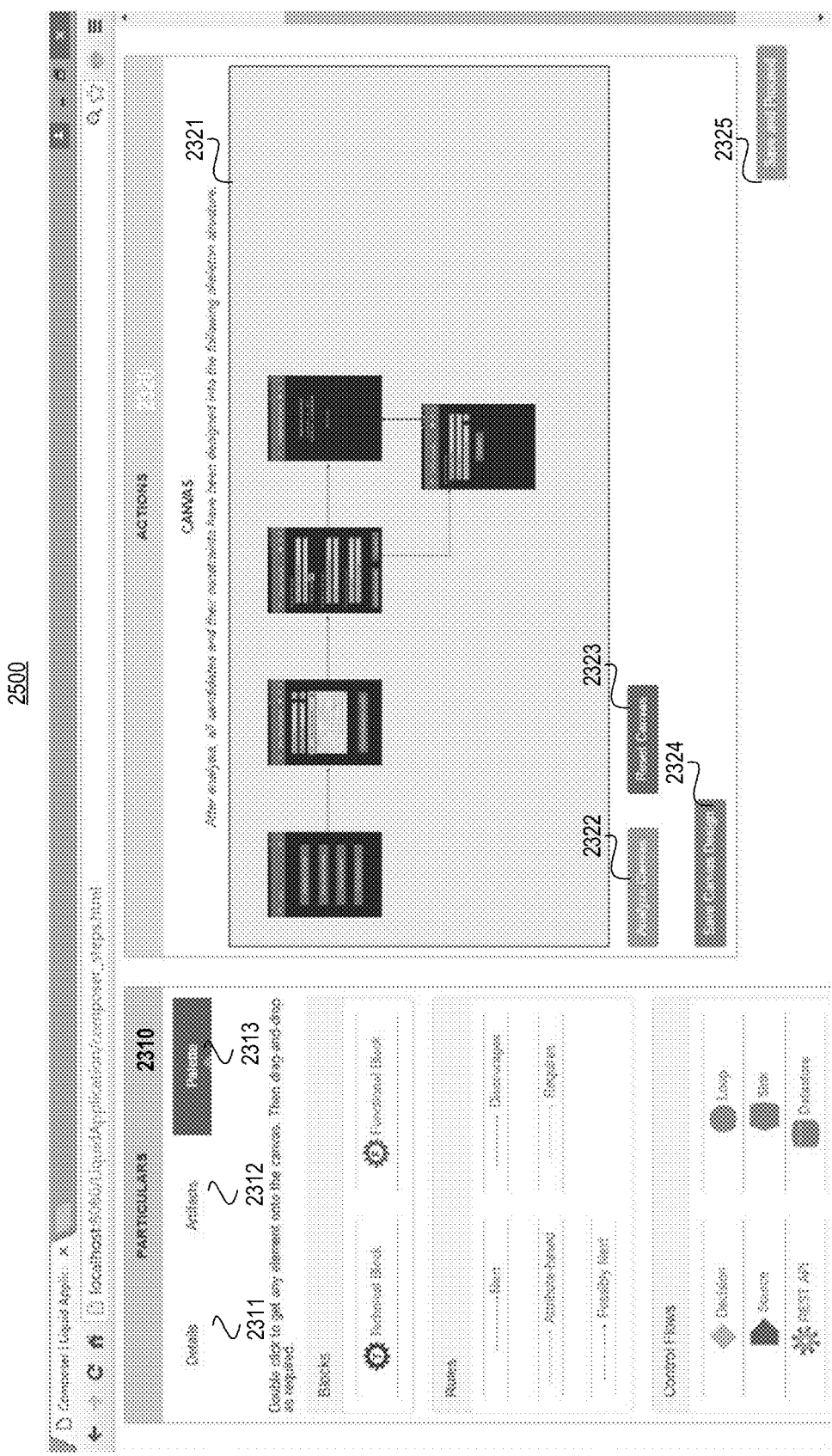
FIG. 25 shows an exemplary application composition graphical user interface of the rapid application developer system.

An exemplary thirteenth GUI 2500 is shown in FIG. 25, where the thirteenth GUI 2500 corresponds to an operation of the application design circuitry 118 within the liquid application portal for implementing at least some of the processes included at (321). The thirteenth GUI 2500 is similar to the eleventh GUI 2300 other than the particulars section 2310 in the thirteenth GUI 2500 displaying the palette option 2313 instead of the details option 2311, based on a selection of the palette option 2313. The palette option 2313 provides a palette menu of entities that may be dragged and dropped into the application canvas 2321 to take part in developing the target application. For example, the palette menu may include blocks, rules, control flows, and screens. A block may be a reusable asset created by a subject matter expert. A Block has a unique name and a set of attributes (0 to n). Each attribute can optionally contain a set of predefined values. A Block also has attributes to captures meta-data about itself for other subject matter experts to explore and understand its purpose. A Block may be comprised of the following attributes: Contributed By: Creator of the block; Description: Detailing the purpose of this block; External Documentation: Additional information (external links, references etc.); Name: A unique name that identifies this block; Reuse Restrictions: Scope of reuse (Project, Engagement, Organization); Sample Code Available: Applicable for technical blocks; Subtype: Sub categorization; Type: (Application, Service, Logical Architecture, Physical Architecture); Image Path: An optional image file path. Architects using this block see this image on their design canvas rather than a default image.

There further be two different types of blocks defined, a functional block and a technical block. A functional block may be a block that focuses on what a system does. For example, a customer relations management (CRM) block may be a functional block in a Banking System. A technical block may be a block that focuses on how a system does. For example, an IBM WAS Server may be a technical block in a 3 tier architecture based system.

A rule defines connections between blocks that can be validated during design time. Exemplary rules include: a next rule is a connection rule between two blocks defining one has to follow the other; a requires rule is a rule that defines a block cannot exist on its own and it mandatorily depends on another block that must be connected to it; a discourages rule is a rule between two blocks, defining a block should not be connected to another block; an attribute-based rule defines a block requires another block to be connected if a particular attribute value is set; a possibly next rule defines a block can be connected to another block, if data transformation from an attribute data type of one block to that of the other block is done. (E.g., xml data representation of one block to json representation of the other block for the corresponding attribute).

Flows may include control flows that aid the composer during the design of the current application canvas.

Screens may include the screen images included in corresponding pretotypes.

Figure 26:
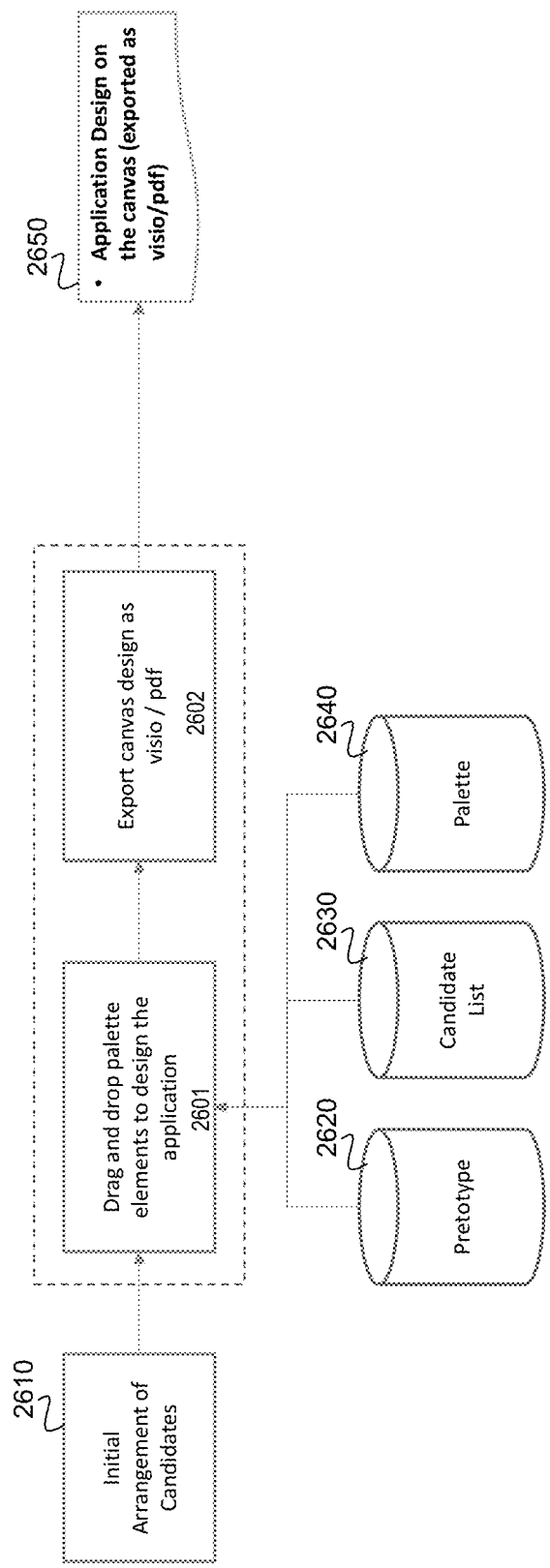
FIG. 26 shows a flow chart of logic describing processes that the rapid application developer system may implement.

FIG. 26 shows a flow chart of logic that may be included to implement process (322) attributed to the application design circuitry 118 for arranging candidate components for designing a target application. The initial candidate component arrangement 2610 is received by the application design circuitry 118 as an input to the process at (322). The initial candidate component arrangement 2610 may include, for example, the candidate components and related information (e.g., identifiers, include blocks, rules, flows, and screens) on the current application canvas. The initial candidate component arrangement 2610 may, for example, be a an arrangement of candidate components included on a canvas as generated by the liquid application portal.

The application design circuitry 118 may further receive control commands (e.g., control inputs from the user for drag and drop operations) for selecting menu items from the palette menu and placing them into the application canvas 2260 (2601). The application design circuitry 118 may control the modification of the candidate components and related information based on such received control commands. The application design circuitry 118 may receive pretotype information from a pretotype database 2620, candidate component information from a candidate component list database 2630, and palette information from a palette database 2640. The pretotype database 2620, the candidate component list database 2630, and the palette database 2640 may be included as part of the RAD database 130.

The application design circuitry 118 may further export the application canvas design (2602). The application canvas design may be in a Microsoft Visio or pdf data file format.

From the processes described as being included at (322), the application canvas 2260 may be generated and exported for further development of the target application.

Figure 27:
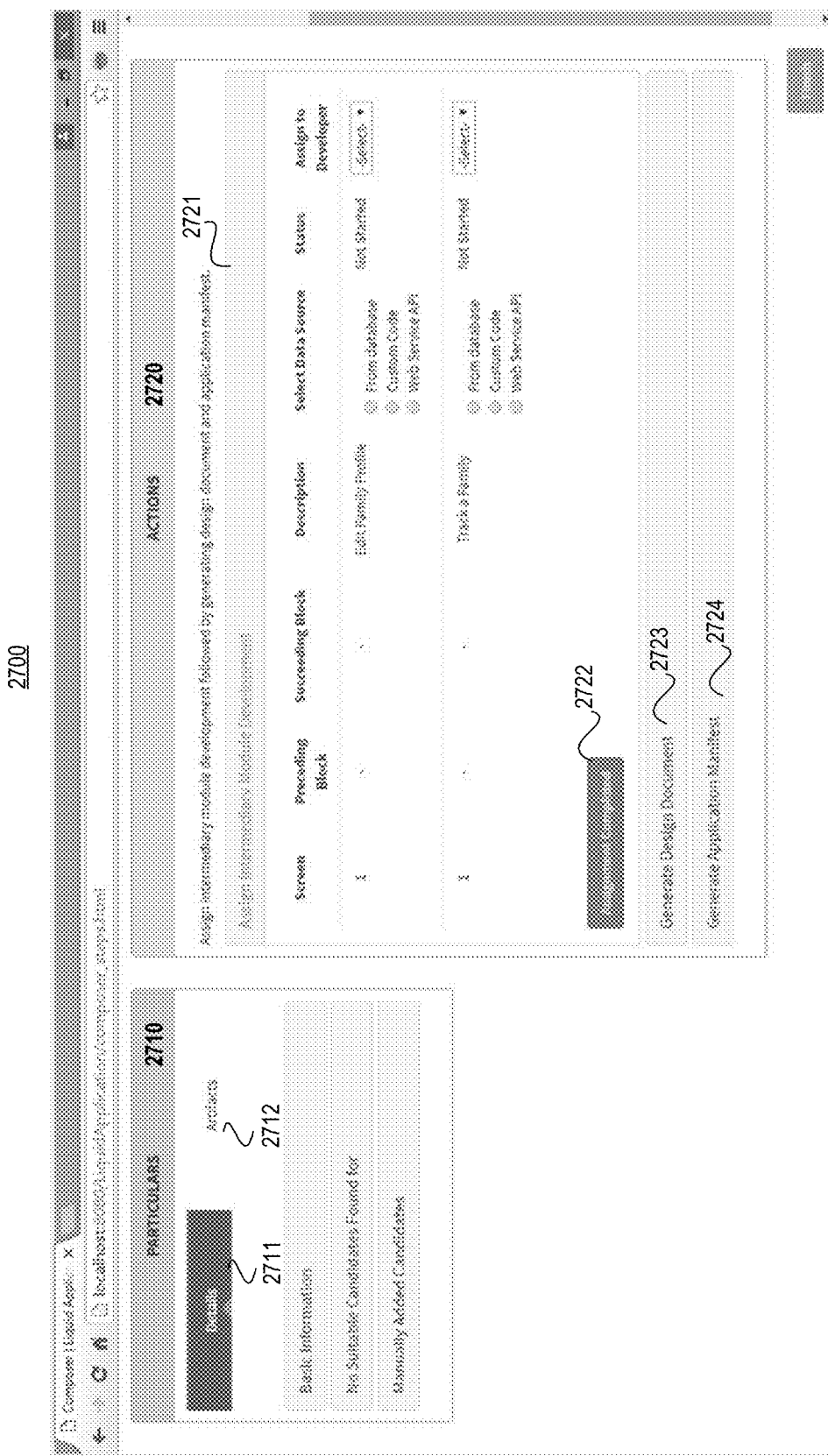
FIG. 27 shows an exemplary application composition graphical user interface of the rapid application developer system.

An exemplary fourteenth GUI 2700 is shown in FIG. 27, where the fourteenth GUI 2700 corresponds to an operation of the application design circuitry 118 within the liquid application portal for implementing at least some of the processes included at (322). The fourteenth GUI 2700 operates according to a process for assigning intermediary module development corresponding to the process at (322).

The fourteenth GUI 2700 includes a particulars section 2710 and an actions section 2720. The actions section 2720 includes an intermediary module development option 2721. The selection of the intermediary module development option 2721, as illustrated by the fourteenth GUI 2700, causes an intermediary module development table to be displayed, where the intermediary module development table is arranged according to application screens, where for each application screen a preceding block, a succeeding block, a description, a data source selection, a status, and a developer assignment is described. The user may assign particular values to the various fields in the intermediary module development table. Once assignment of values into the intermediary module development table is complete, the user may select an assignment completed option 2722 for saving the assignment inputs. The actions section 2720 may further include a generate design document option 2723 for the application design circuitry 118 to generate a design document according to the information available. The actions section 2720 also includes a generate application manifest option 2724 for the application design circuitry 118 to generate an application manifest based on the information available.

The particulars section 2710 includes an artifacts option 2711 that presents information describing obtained pretotypes. The artifacts option 2711 may be organized according to application screens that are included for a particular pretotype.

Figure 28:
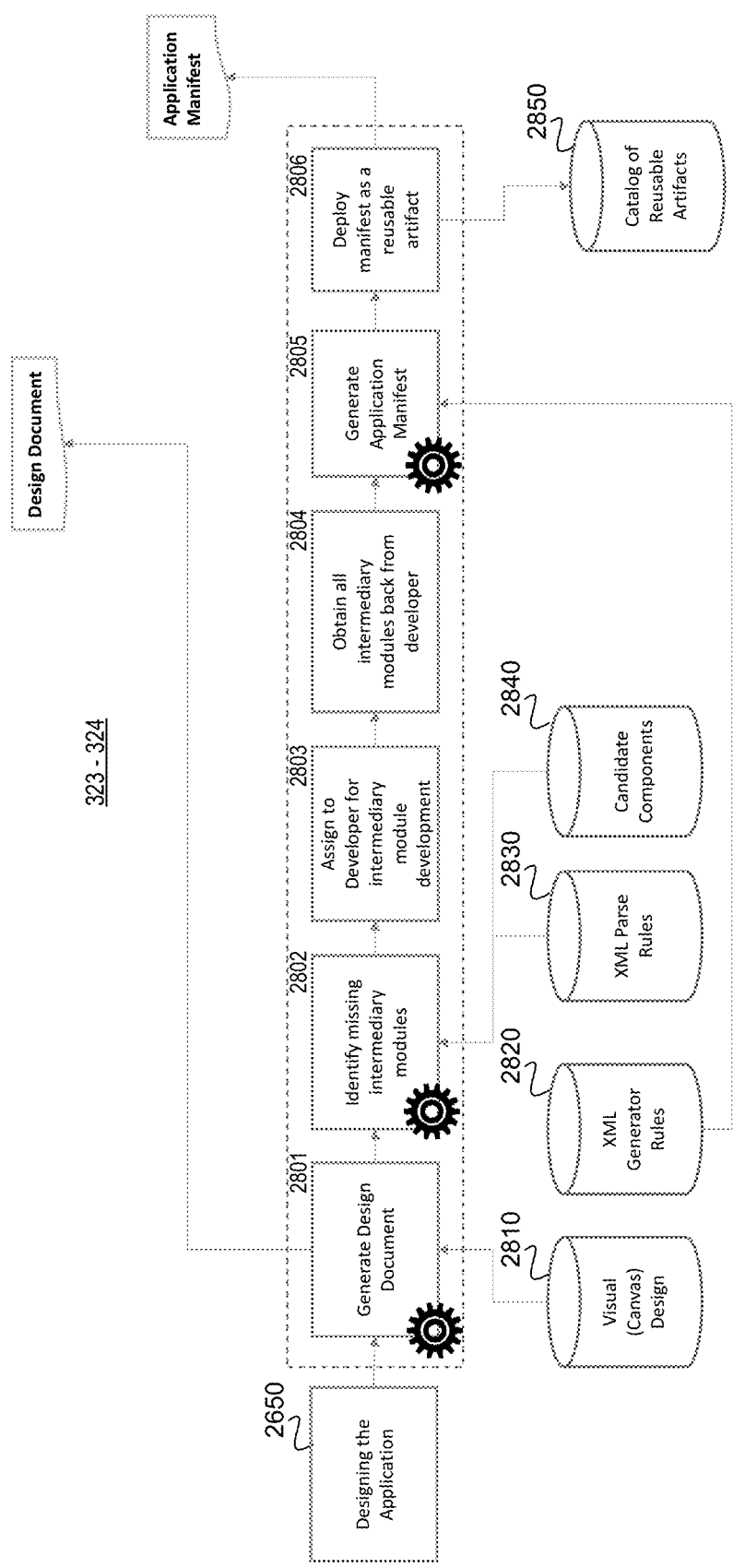
FIG. 28 shows a flow chart of logic describing processes that the rapid application developer system may implement.

FIG. 28 shows a flow chart of logic that may be included to implement processes (323) to (324) attributed to the application design circuitry 118 for generating a design document and generating the application manifest. The application design 2650 may be received by the application design circuitry 118 as an input to the processes at (323)-(324).

Based on the received application design 2650, the application design circuitry 118 may generate a design document (2801). The design document may be a pdf data file and, at least in part, include all details of the application, including the individual screen-images, navigation image, meta data from all screens, candidates selected. For example, generated design document may be based on information received from a visual canvas design database 2810. The visual canvas design database 2810, and the XML generator rules database 2820, may be included as part of the RAD database 130.

The application design circuitry 118 may further identify missing intermediary components or modules from the target application described by the design document (2802). When a new application is created, while some of the functionality may be achieved by reusing some of the existing APIs and services, there might be some new or additional functionality, which still requires additional coding. These modules are termed as intermediary modules. Also, there might be situations such as during data format conversion from xml to json format or during any data retrieval operation, which may require explicit coding.

The missing intermediary components may be determined based on information received from an XML parse rules database 2830 and information received from a candidate components database 2840. Both the XML parse rules database 2830 and the XML parse rules database 2830 may be included as part of the RAD database 130.

The application design circuitry 118 may further identify and assign a developer for developing intermediary modules that were identified (2803). Once assigned, the assigned developer is tasked with developing the missing intermediary modules. For example, referring back to block diagram 300, the development of the identified missing intermediary modules may be assigned to developer circuitry 120. After the developer circuitry 120 develops the intermediary modules, the intermediary modules may be transmitted back to the application design circuitry 118.

Referring back to FIG. 28, after the intermediary modules are developed by the assigned developer, the application design circuitry 118 may further receive the intermediary modules from the assigned developer (2804).

The application design circuitry 118 may further generate an application manifest (2805). The application manifest may be generated in an XML or JavaScript Object Notation (JSON) data file format (e.g., as shown by CINI_Manifest.xml and CINI_Manifest.json illustrated in FIG. 30). When the application manifest is generated in an XML data file format, rules information from the XML generator rules database 2820 may be relied upon. The application manifest is a data file that may be stored. For example, the application design circuitry 118 is shown to store the application manifest into a catalog of reusable artifacts database 2850 as a reusable artifact (2806). The application manifest may further be transmitted to a developer to build the target application described by the application manifest. For example, block diagram 300 shows the application design circuitry 118 transmitting the application manifest generated at (324) to the developer circuitry 120. Once received, the developer circuitry 120 builds the final target application.

Figure 29:
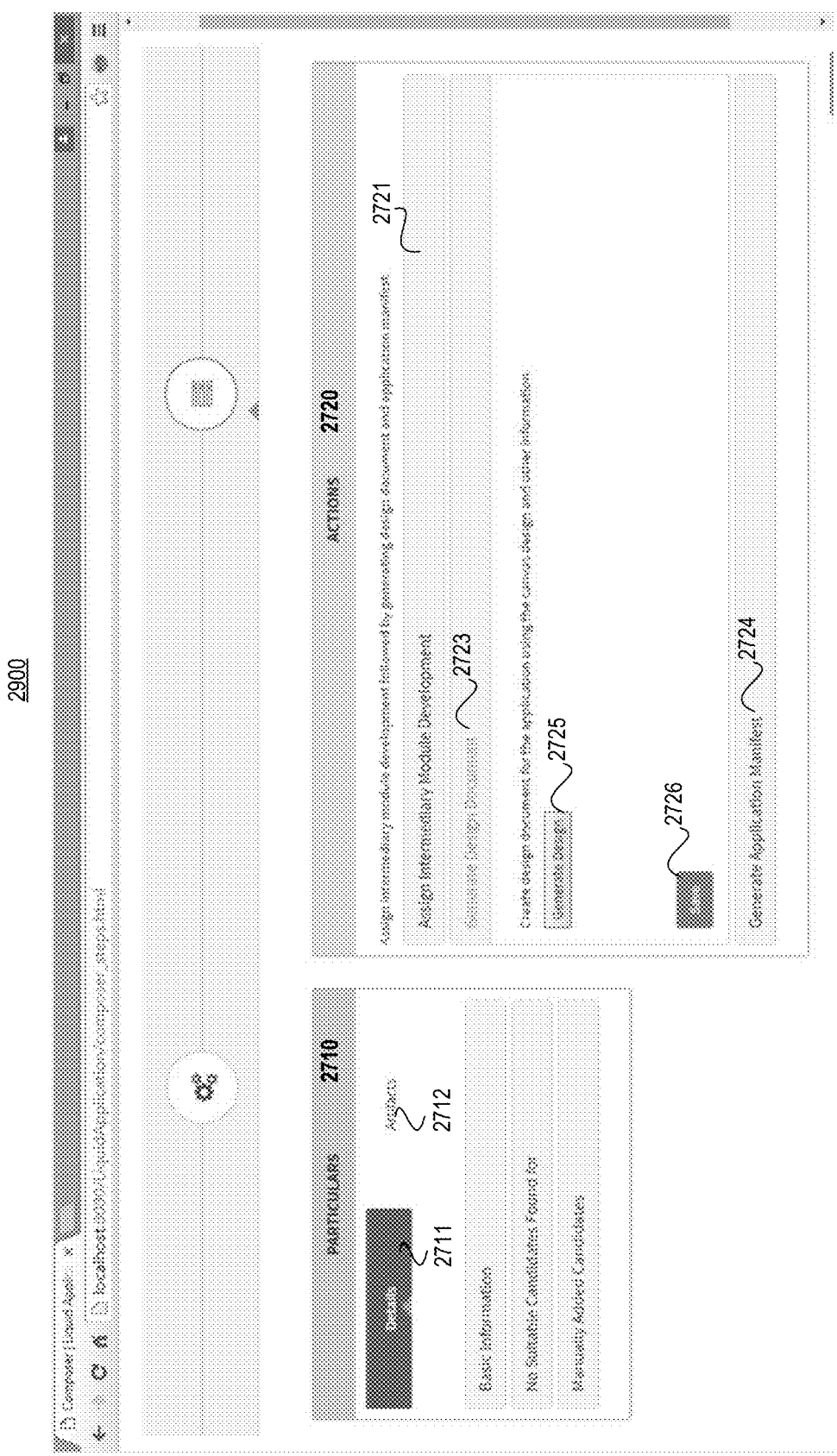
FIG. 29 shows an exemplary application composition graphical user interface of the rapid application developer system.

An exemplary fifteenth GUI 2900 is shown in FIG. 29, where the fifteenth GUI 2900 corresponds to an operation of the application design circuitry 118 within the liquid application portal for implementing at least some of the processes included at processes (323) to (324). The fifteenth GUI 2900 is similar to the fourteenth GUI 2700. However, the fifteenth GUI 2900 is shown to have the generate design document option 2723 selected. Selection of the generate design document option 2723 causes the application design circuitry 118 to display a generate design tab 2725, where selection of the generate design tab 2725 causes the application design circuitry 118 to generate a design document (e.g., generate a design document according to (2801)). The generated design document may be saved by selection of the save option 2726.

Figure 30:
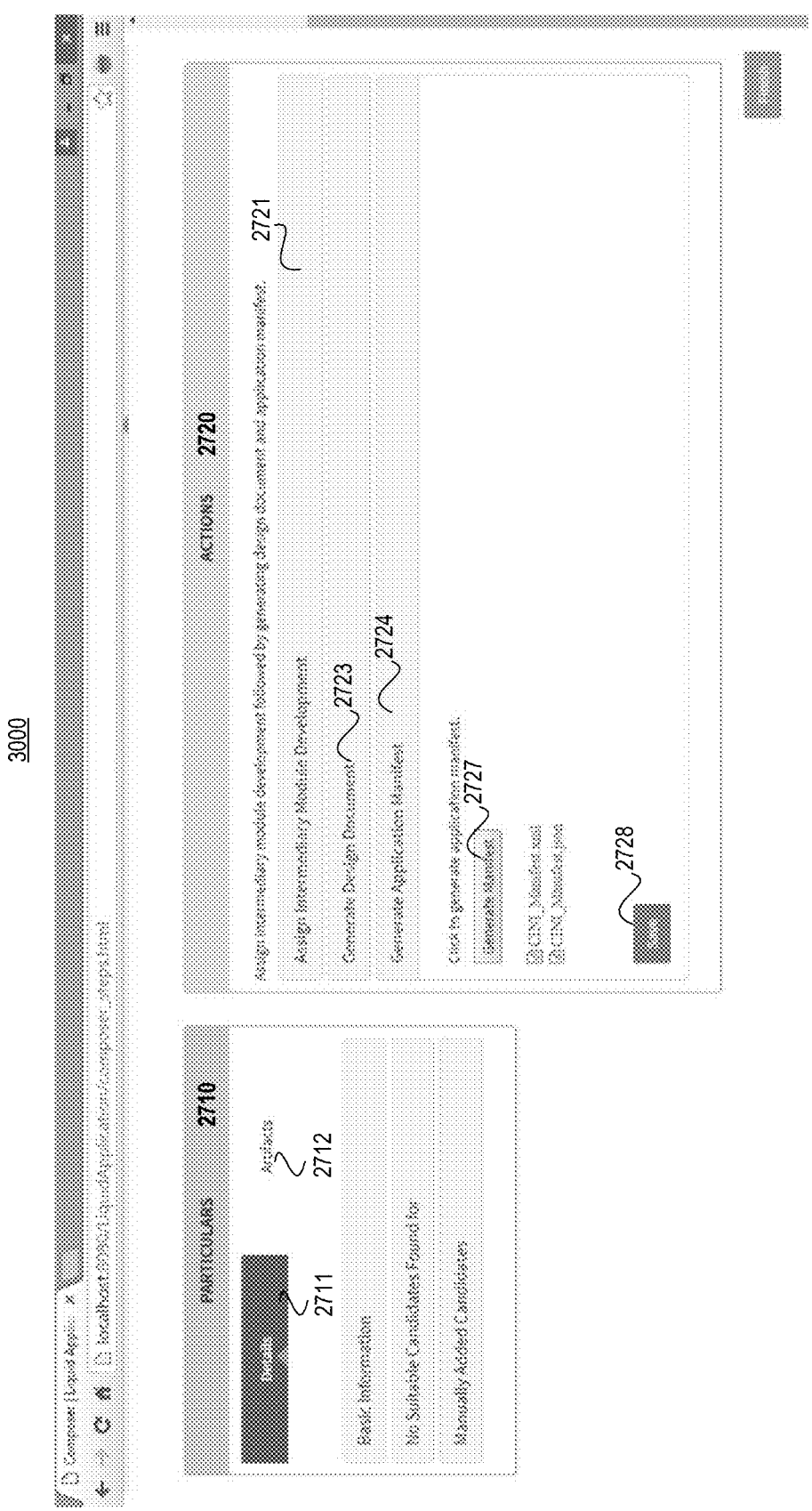
FIG. 30 shows an exemplary application composition graphical user interface of the rapid application developer system.

An exemplary sixteenth GUI 3000 is shown in FIG. 30, where the sixteenth GUI 3000 corresponds to an operation of the application design circuitry 118 within the liquid application portal for implementing at least some of the processes included at processes (323) to (324). The fifteenth GUI 2900 is similar to the fourteenth GUI 2700. However, the sixteenth GUI 3000 is shown to have the generate application manifest document option 2724 selected. Selection of the generate manifest document option 2723 causes the application design circuitry 118 to display a generate manifest tab 2727, where selection of the generate manifest tab 2727 causes the application design circuitry 118 to generate an application manifest document (e.g., generate an application manifest document according to (2805)). The generated application manifest document may be saved by selection of the save option 2728. The exemplary application manifest documents shown in the sixteenth GUI 3000 include CINI_manifest.xml and CINI_manifest.json.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

What is claimed is:

1. A method for generating an application manifest, the method comprising:
   receiving an application industry selection for a target application;
   receiving a target application model selection input for identifying a target application model corresponding to the target application;

accessing the target application model based on the target application model selection input, where the target application model comprises a framework for the target application that includes at least an image of an application graphical user interface, application component identifiers of functional components in the target application model, and navigational flow information describing relationships and navigational rules between different screens for the target application model;

extracting functionality metadata from the target application model that identifies a functional component included in the images of the application graphical user interface, the functional component in the target application model, and the navigational flow information;

receiving a plurality of selected candidate components for the target application responsive to the functionality metadata;

displaying an application composition graphical user interface (GUI) comprising an application canvas area and a palette menu displayed separately from the application canvas area, wherein:

the palette menu includes a set of application building entities including at least a set of blocks, a set of rules, and a set of flow visuals, wherein a block included in the set of blocks includes machine-readable metadata comprising at least reuse restriction data and sample code data, wherein the reuse restriction data describes a scope of reuse for the corresponding block, and the sample code includes machine executable code for the corresponding block; and the application canvas area includes the selected candidate components displayed to depict an exemplary navigational flow between the selected candidate components according to the navigational flow information;

receiving a selected application building entity and a selected flow visual from the set of application building entities;

displaying, within the application canvas area, the selected application building entity and the selected flow visual applied to the selected candidate components displayed in the application canvas area; and generating an application manifest for the target application responsive to the selected candidate components, the selected flow visual, and the selected application building entity.

2. The method of claim 1, wherein extracting the functionality metadata from the target application model comprises:

analyzing the image of the graphical user interface; and extracting component information from the analyzed image of the graphical user interface, wherein the component information identifies at least one component included in the image of the graphical user interface.

3. The method of claim 1, wherein the functionality metadata includes at least one of a data input field included in the image of the graphical user interface, a data output field included in the image of the graphical user interface, category information corresponding to the image of the graphical user interface, tag information describing a component included in the image of the graphical user interface, a textbox field included in the image of the graphical user interface, a dropdown menu field included in the image of the graphical user interface, a navigational button included in the image of the graphical user interface, a graphical user interface widget included in the image of the graphical user interface, or a component group included in the image of the graphical user interface.

4. The method of claim 1, further comprising:

generating a target application design for the target application based at least on the plurality of candidate components, the functionality metadata, and the selected application building entity, wherein the target application design identifies relationships between candidate graphical user interfaces included in the target application design; and wherein generating the application manifest is based on the target application design.

5. The method of claim 4, further comprising:

revising the target application design based on the selected candidate components and the selected application building entity; and generating a revised application manifest based on the revised target application design.

6. The method of claim 1, wherein the target application model is created based on a previously developed application.

7. The method of claim 1, wherein the functional components in the target application model are obtained by extracting image information from the image of the application graphical user interface.

8. The method of claim 1, further comprising:

transmitting the application manifest to an application developer, wherein the application developer is configured to receive the application manifest and build the target application based on the application manifest.

9. A system for generating an application manifest, the system comprising:

a business analysis circuitry configured to:

receive an application industry selection for a target application;

receive a target application model selection input for identifying a target application model corresponding to the target application; and access the target application model based on the target application model selection input, where the target application model comprises a framework for the target application that includes at least an image of an application graphical user interface, application component identifiers of functional components in the target application model, and navigational flow information describing relationships and navigational rules between different screens for the target application model;

a component analysis circuitry configured to:

extract functionality metadata from the target application model that identifies a functional component included in the images of the application graphical user interface, the functional component in the target application model, and the navigational flow information;

receive a plurality of selected candidate components for the target application responsive to the functionality metadata; and display an application composition graphical user interface (GUI) comprising an application canvas area and a palette menu displayed separately from the application canvas area, wherein:

the palette menu includes a set of application building entities including at least a set of blocks, a set of rules, and a set of flow visuals, wherein a block included in the set of blocks includes machine-readable metadata comprising at least reuse restriction data and sample code data, wherein the reuse restriction data describes a scope of reuse for the corresponding block, and the sample code includes machine executable code for the corresponding block; and the application canvas area includes the selected candidate components displayed to depict an exemplary navigational flow between the selected candidate components according to the navigational flow information;

an application design circuitry configured to:
receive a selected application building entity and a selected flow visual;
display, within the application canvas area, the selected application building entity and the selected flow visual applied to the selected candidate components displayed in the application canvas area; and
generate an application manifest for the target application responsive to the selected candidate components, the selected flow visual, and the selected application building entity.

10. The system of claim 9, wherein the component analysis circuitry is configured to extract the functionality metadata from the target application model by:
analyzing the image of the graphical user interface; and
extracting component information from the analyzed image of the graphical user interface, wherein the component information identifies at least one component included in the image of the graphical user interface.

11. The system of claim 9, wherein the functionality metadata includes at least one of a data input field included in the image of the graphical user interface, a data output field included in the image of the graphical user interface, category information corresponding to the image of the graphical user interface, tag information describing a component included in the image of the graphical user interface, a textbox field included in the image of the graphical user interface, a dropdown menu field included in the image of the graphical user interface, a navigational button included in the image of the graphical user interface, a graphical user interface widget included in the image of the graphical user interface, or a component group included in the image of the graphical user interface.

12. The system of claim 9, wherein the application design circuitry is further configured to:
generate a target application design for the target application based at least on the plurality of candidate components, the functionality metadata, and the selected application building entity, wherein the target application design identifies relationships between candidate graphical user interfaces included in the target application design; and
generate the application manifest based on the target application design.

13. The system of claim 12, wherein the application design circuitry is further configured to:
revise the target application design based on the selected candidate components; and
generate a revised application manifest based on the revised target application design.

14. The system of claim 9, wherein the target application model is created based on a previously developed application.

15. The system of claim 9, wherein the functional components in the target application model are obtained by extracting image information from the image of the application graphical user interface.

16. The system of claim 9, wherein the application design circuitry is further configured to:
transmit the application manifest to an application developer, wherein the application developer is configured to receive the application manifest and build the target application based on the application manifest.

17. A computing device comprising:
a memory configured to store a target application model, where the target application model comprises a framework for a target application that includes at least an image of an application graphical user interface, application component identifiers of functional components in the target application model, and navigational flow information describing relationships and navigational rules between different screens for the target application model; and
a processor configured to:
receive an application industry selection for the target application;
receive a target application model selection input for identifying the target application model;
access the target application model from the memory based on the target application model selection input;
extract functionality metadata from the target application model that identifies a functional component included in the images of the application graphical user interface, the functional component in the target application model, and the navigational flow information;
receive a plurality of selected candidate components for the target application responsive to the functionality metadata;
display an application composition graphical user interface (GUI) comprising an application canvas area and a palette menu displayed separately from the application canvas area, wherein:
the palette menu includes a set of application building entities including at least a set of blocks, a set of rules, and a set of flow visuals, wherein a block included in the set of blocks includes machine-readable metadata comprising at least reuse restriction data and sample code data, wherein the reuse restriction data describes a scope of reuse for the corresponding block, and the sample code includes machine executable code for the corresponding block; and
the application canvas area includes the selected candidate components displayed to depict an exemplary navigational flow between the selected candidate components according to the navigational flow information;
receive a selected application building entity and a selected flow visual;
display, within the application canvas area, the selected application building entity and the selected flow visual applied to the selected candidate components displayed in the application canvas area; and
generate an application manifest for the target application responsive to the selected candidate components, the selected flow visual, and the selected application building entity.

18. The computing device of claim 17, wherein the target application model is created based on a previously developed application.

* * * * *